US012615613B2

(12) United States Patent
Manolakos et al.

(10) Patent No.: US 12,615,613 B2
(45) Date of Patent: Apr. 28, 2026

(54) SIGNALLING FOR REQUESTING PREFERRED ON-DEMAND POSITIONING REFERENCE SIGNAL (PRS) CONFIGURATIONS OR PARAMETERS FROM A TRANSMITTING DEVICE

(71) Applicant: QUALCOMM Incorporated, San Diego, CA (US)

(72) Inventors: Alexandros Manolakos, Escondido, CA (US); Mukesh Kumar, Hyderabad (IN); Guttorm Ringstad Opshaug, Redwood City, CA (US); Srinivas Yerramalli, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 285 days.

(21) Appl. No.: 18/548,454

(22) PCT Filed: Mar. 17, 2022

(86) PCT No.: PCT/US2022/071197
§ 371 (c)(1),
(2) Date: Aug. 30, 2023

(87) PCT Pub. No.: WO2022/221805
PCT Pub. Date: Oct. 20, 2022

(65) Prior Publication Data
US 2024/0137901 A1 Apr. 25, 2024
US 2024/0236919 A9 Jul. 11, 2024

(30) Foreign Application Priority Data

Apr. 12, 2021 (IN) .............................. 202141017088

(51) Int. Cl.
| | | |
|---|---|---|
| *H04W 64/00* | (2009.01) | |
| *H04J 3/06* | (2006.01) | |
| *H04L 5/00* | (2006.01) | |

(52) U.S. Cl.
CPC ........... *H04W 64/00* (2013.01); *H04J 3/0661* (2013.01); *H04L 5/0051* (2013.01)

(58) Field of Classification Search
CPC ...... H04W 64/00; H04L 5/0051; H04J 3/0661
See application file for complete search history.

(56) References Cited

U.S. PATENT DOCUMENTS

| | | |
|---|---|---|
| 11,451,928 B2 | 9/2022 | Manolakos et al. |
| 2020/0028648 A1 | 1/2020 | Akkarakaran et al. |

(Continued)

FOREIGN PATENT DOCUMENTS

| | | |
|---|---|---|
| WO | WO-2020146820 A1 | 7/2020 |
| WO | WO-2021029997 | 2/2021 |

OTHER PUBLICATIONS

3GPP TS 38.305: "3rd Generation Partnership Project; Technical Specification Group Radio Access Network; NG Radio Access Network (NG-RAN); Stage 2 functional specification of User Equipment (UE) positioning in NG-RAN (Release 16)", V16.4.0 (Mar. 2021) (Year: 2021).*

(Continued)

*Primary Examiner* — Nader Bolourchi
(74) *Attorney, Agent, or Firm* — QUALCOMM Incorporated

(57) ABSTRACT

Disclosed are techniques for positioning. In an aspect, a network node receives, from a location server, a first request requesting on-demand positioning reference signal (PRS) configurations supported by the network node, transmits a response to the location server, the response identifying one or more alternate PRS configurations, one or more alternate (Continued)

PRS parameters, or both defining one or more on-demand PRS resources the network node would prefer to transmit during a positioning session between the location server and one or more target UEs, receives, from the location server, a second request requesting on-demand PRS transmission, the second request identifying at least one alternate PRS configuration, at least one alternate PRS parameter, or both, and transmits at least one on-demand PRS resource according to the at least one alternate PRS configuration, the at least one PRS parameter, or both.

40 Claims, 19 Drawing Sheets

(56)                    References Cited

U.S. PATENT DOCUMENTS

| | | | | |
|---|---|---|---|---|
| 2020/0154240 | A1 | 5/2020 | Edge et al. | |
| 2021/0051442 | A1* | 2/2021 | Manolakos | H04W 4/029 |
| 2022/0116089 | A1* | 4/2022 | Khoryaev | H04W 64/00 |

OTHER PUBLICATIONS

3GPP TS 23.273: "3rd Generation Partnership Project; Technical Specification Group Services and System Aspects; 5G System (5GS) Location Services (LCS); Stage 2 (Release 16)", V16.4.0 (Jul. 2020), 3GPP Draft, 23273-G40, 3rd Generation Partnership Project (3GPP), Mobile Competence Centre, 650, Route Des Lucioles, F-06921, Sophia-Antipolis Cedex, France, Jul. 9, 2020 (Jul. 9, 2020), XP051907971, pp. 1-95, Retrieved from the Internet: URL: https://ftp.3gpp.org/3guinternal/3GPP_ultimate_versions_to_be_ transposed/sentToDpc/23273-g40.zip 23273-g40.docx [retrieved on Jul. 9, 2020] paragraph [d.8.10.4] figures 8.10.4-1.

Interdigital Inc: "Enhancements for Latency Reduction", 3GPP Draft, R2-2103785, 3GPP RAN WG2 Meeting #113-e, 3rd Generation Partnership Project (3GPP), Mobile Competence Centre, 650, Route Des Lucioles, F-06921, Sophia-Antipolis Cedex, France, vol. RAN WG2, No. Electronic, Apr. 12, 2021-Apr. 20, 2021, Apr. 1, 2021 (Apr. 1, 2021), XP051992249, pp. 1-5, Retrieved from the Internet: URL: https://ftp.3gpp.org/tsg_ran/WG2_RL2/TSGR2_ 113bis-e/Docs/R2-2103785.zip , R2-2103785 (R17 NR POSWI_ AI8112_Latency).doc [retrieved on Apr. 1, 2021] paragraph [02.3].

International Search Report and Written Opinion—PCT/US2022/ 071197—ISA/EPO—Jun. 24, 2022.

LG Electronics: "Discussions on UE and gNB Measurements for NR Positioning", 3GPP Draft, R1-1912274, 3GPP TSG RAN WG1 #99, 3rd Generation Partnership Project (3GPP), Mobile Competence Centre, 650, Route Des Lucioles, F-06921, Sophia-Antipolis Cedex, France, vol. RAN WG1, No. Reno, USA, Nov. 18, 2019-Nov. 22, 2019, Nov. 9, 2019 (Nov. 9, 2019), XP051823339, 16 Pages, Retrieved from the Internet: URL: https://ftp.3gpp.org/tsg_ ran/WG1_RL1/TSGR1_99/Docs/R1-1912274.zip R1-1912274 UE and gNB measurement.docx [retrieved on Nov. 9, 2019] paragraph [02.2].

QUALCOMM Incorporated: "NR Positioning Enhancements", 3GPP Draft, R2-2010095, 3GPP TSG-RAN WG2 Meeting #112-e, 3rd Generation Partnership Project (3GPP), Mobile Competence Centre, 650, Route Des Lucioles, F-06921, Sophia-Antipolis Cedex, France, vol. RAN WG2, No. Electronic, Nov. 2, 2020-Nov. 13, 2020, Oct. 23, 2020 (Oct. 23, 2020), XP051942800, pp. 1-9, Retrieved from the Internet: URL: https://ftp.3gpp.org/tsg_ran/WG2_ RL2/TSGR2_112-e/Docs/R2-2010095.zip , R2-2010095_ (Positioning Enhancements).docx, retrieved on Oct. 23, 2020] figure 3.

Taiwan Search Report—TW111110198—TIPO—Jul. 20, 2025.

* cited by examiner

```
NR-DL-PRS-AssistanceDataPerTRP-r16 ::= SEQUENCE {
    dl-PRS-ID-r16                           INTEGER (0..255),
    nr-PhysCellID-r16                       NR-PhysCellID-r16              OPTIONAL
    nr-CellGlobalID-r16                     NCGI-r15                      OPTIONAL
    nr-ARFCN-r16                            ARFCN-ValueNR-r15              OPTIONAL
    nr-DL-PRS-SFN0-Offset-r16              NR-DL-PRS-SFN0-Offset-r16,
    nr-DL-PRS-ExpectedRSTD-r16            INTEGER (-3841..3841),
    nr-DL-PRS-ExpectedRSTD-Uncertainty-r16
                                           INTEGER (0..246),
    nr-DL-PRS-Info-r16                     NR-DL-PRS-Info-r16,
    ...
}
```

```
NR-DL-PRS-PositioningFrequencyLayer-r16  ::= SEQUENCE {
    dl-PRS-SubcarrierSpacing-r16           ENUMERATED {kHz15, kHz30, kHz60, kHz120, ....},
    dl-PRS-ResourceBandwidth-r16          INTEGER (1..63),
    dl-PRS-StartPRB-r16                    INTEGER (0..2176),
    dl-PRS-PointA-r16                      ARFCN-ValueNR-r15,
    dl-PRS-CombSizeN-r16                  ENUMERATED {n2, n4, n6, n12, ....},
    dl-PRS-CyclicPrefix-r16               ENUMERATED {normal, extended, ....},
    ...
}
```

```
NR-DL-PRS-SFN0-Offset-r16 ::= SEQUENCE {
    sfn-Offset-r16                         INTEGER (0..1023),
    integerSubframeOffset-r16             INTEGER (0..9),
    ...}
```

```
NR-DL-PRS-Resource-r16 ::= SEQUENCE {
    nr-DL-PRS-ResourceID-r16              NR-DL-PRS-ResourceID-r16,
    dl-PRS-SequenceID-r16                 INTEGER (0... 4095),
    dl-PRS-CombSizeN-AndReOffset-r16      CHOICE {
        n2-r16                                INTEGER (0..1),
        n4-r16                                INTEGER (0..3),
        n6-r16                                INTEGER (0..5),
        n12-r16                               INTEGER (0..11),
        ...
    },
    dl-PRS-ResourceSlotOffset-r16         INTEGER (0..nrMaxResourceOffsetValue-1-r16),
    dl-PRS-ResourceSymbolOffset-r16       INTEGER (0..12),
    dl-PRS-QCL-Info-r16                   DL-PRS-QCL-Info-r16                OPTIONAL,
    ...
}
```

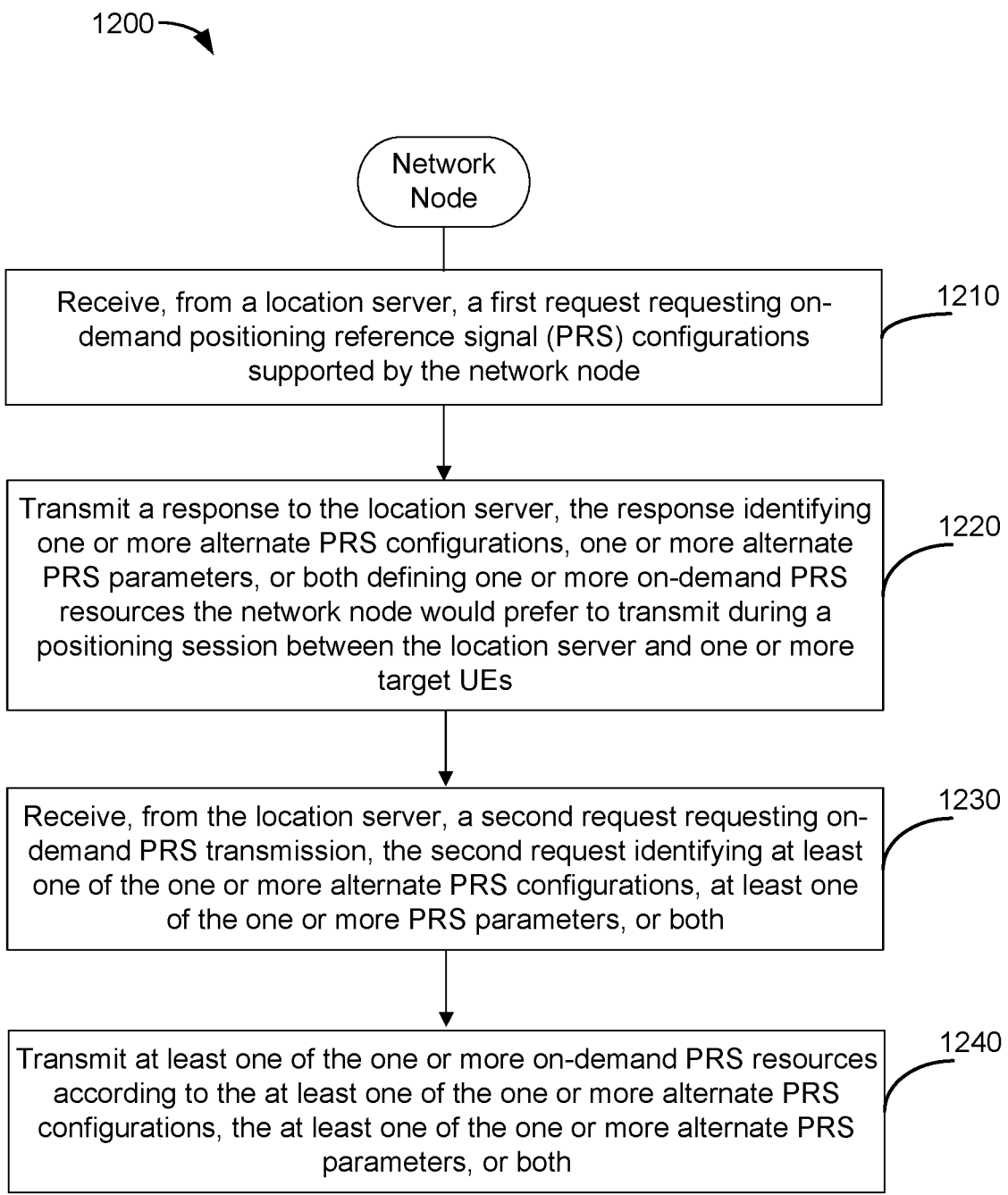

1200

Network
Node

Receive, from a location server, a first request requesting on-demand positioning reference signal (PRS) configurations supported by the network node    1210

Transmit a response to the location server, the response identifying one or more alternate PRS configurations, one or more alternate PRS parameters, or both defining one or more on-demand PRS resources the network node would prefer to transmit during a positioning session between the location server and one or more target UEs    1220

Receive, from the location server, a second request requesting on-demand PRS transmission, the second request identifying at least one of the one or more alternate PRS configurations, at least one of the one or more PRS parameters, or both    1230

Transmit at least one of the one or more on-demand PRS resources according to the at least one of the one or more alternate PRS configurations, the at least one of the one or more alternate PRS parameters, or both    1240

*FIG. 12*

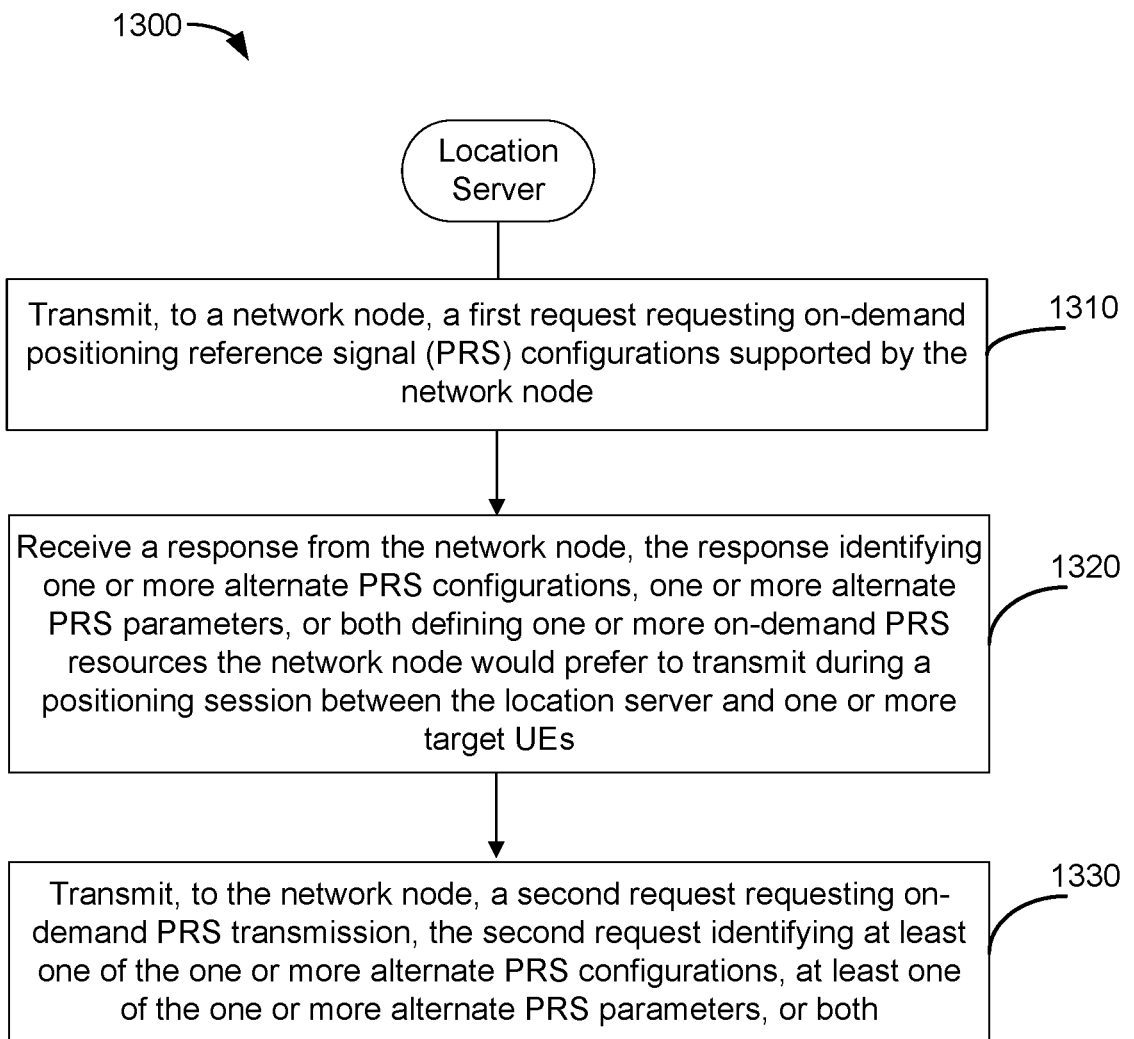

1300

Location Server

Transmit, to a network node, a first request requesting on-demand positioning reference signal (PRS) configurations supported by the network node    1310

Receive a response from the network node, the response identifying one or more alternate PRS configurations, one or more alternate PRS parameters, or both defining one or more on-demand PRS resources the network node would prefer to transmit during a positioning session between the location server and one or more target UEs    1320

Transmit, to the network node, a second request requesting on-demand PRS transmission, the second request identifying at least one of the one or more alternate PRS configurations, at least one of the one or more alternate PRS parameters, or both    1330

*FIG. 13*

SIGNALLING FOR REQUESTING PREFERRED ON-DEMAND POSITIONING REFERENCE SIGNAL (PRS) CONFIGURATIONS OR PARAMETERS FROM A TRANSMITTING DEVICE

CROSS-REFERENCE TO RELATED APPLICATIONS

The present Application for Patent claims priority to Indian Patent Application No. 202141017088, entitled "SIGNALLING FOR REQUESTING PREFERRED ON-DEMAND POSITIONING REFERENCE SIGNAL (PRS) CONFIGURATIONS OR PARAMETERS FROM A TRANSMITTING DEVICE," filed Apr. 12, 2021, and is a national stage application, filed under 35 U.S.C. § 371, of International Patent Application No. PCT/US2022/071197, entitled "SIGNALLING FOR REQUESTING PREFERRED ON-DEMAND POSITIONING REFERENCE SIGNAL (PRS) CONFIGURATIONS OR PARAMETERS FROM A TRANSMITTING DEVICE," filed Mar. 17, 2022, both of which are assigned to the assignee hereof and expressly incorporated herein by reference in their entirety

BACKGROUND OF THE DISCLOSURE

1. Field of the Disclosure

Aspects of the disclosure relate generally to wireless communications.

2. Description of the Related Art

Wireless communication systems have developed through various generations, including a first-generation analog wireless phone service (1G), a second-generation (2G) digital wireless phone service (including interim 2.5G and 2.75G networks), a third-generation (3G) high speed data, Internet-capable wireless service and a fourth-generation (4G) service (e.g., Long Term Evolution (LTE) or WiMax). There are presently many different types of wireless communication systems in use, including cellular and personal communications service (PCS) systems. Examples of known cellular systems include the cellular analog advanced mobile phone system (AMPS), and digital cellular systems based on code division multiple access (CDMA), frequency division multiple access (FDMA), time division multiple access (TDMA), the Global System for Mobile communications (GSM), etc.

A fifth generation (5G) wireless standard, referred to as New Radio (NR), calls for higher data transfer speeds, greater numbers of connections, and better coverage, among other improvements. The 5G standard, according to the Next Generation Mobile Networks Alliance, is designed to provide data rates of several tens of megabits per second to each of tens of thousands of users, with 1 gigabit per second to tens of workers on an office floor. Several hundreds of thousands of simultaneous connections should be supported in order to support large sensor deployments. Consequently, the spectral efficiency of 5G mobile communications should be significantly enhanced compared to the current 4G standard. Furthermore, signaling efficiencies should be enhanced and latency should be substantially reduced compared to current standards.

SUMMARY

The following presents a simplified summary relating to one or more aspects disclosed herein. Thus, the following summary should not be considered an extensive overview relating to all contemplated aspects, nor should the following summary be considered to identify key or critical elements relating to all contemplated aspects or to delineate the scope associated with any particular aspect. Accordingly, the following summary has the sole purpose to present certain concepts relating to one or more aspects relating to the mechanisms disclosed herein in a simplified form to precede the detailed description presented below.

In an aspect, a method of positioning performed by a network node includes receiving, from a location server, a first request requesting on-demand positioning reference signal (PRS) configurations supported by the network node; transmitting a response to the location server, the response identifying one or more alternate PRS configurations, one or more alternate PRS parameters, or both defining one or more on-demand PRS resources the network node would prefer to transmit during a positioning session between the location server and one or more target UEs; receiving, from the location server, a second request requesting on-demand PRS transmission, the second request identifying at least one of the one or more alternate PRS configurations, at least one of the one or more alternate PRS parameters, or both; and transmitting at least one of the one or more on-demand PRS resources according to the at least one of the one or more alternate PRS configurations, the at least one of the one or more alternate PRS parameters, or both.

In an aspect, a method of positioning performed by a location server includes transmitting, to a network node, a first request requesting on-demand positioning reference signal (PRS) configurations supported by the network node; receiving a response from the network node, the response identifying one or more alternate PRS configurations, one or more alternate PRS parameters, or both defining one or more on-demand PRS resources the network node would prefer to transmit during a positioning session between the location server and one or more target UEs; and transmitting, to the network node, a second request requesting on-demand PRS transmission, the second request identifying at least one of the one or more alternate PRS configurations, at least one of the one or more alternate PRS parameters, or both.

In an aspect, a network node includes a memory; at least one transceiver; and at least one processor communicatively coupled to the memory and the at least one transceiver, the at least one processor configured to: receive, via the at least one transceiver, from a location server, a first request requesting on-demand positioning reference signal (PRS) configurations supported by the network node; cause the at least one transceiver to transmit a response to the location server, the response identifying one or more alternate PRS configurations, one or more alternate PRS parameters, or both defining one or more on-demand PRS resources the network node would prefer to transmit during a positioning session between the location server and one or more target UEs; receive, via the at least one transceiver, from the location server, a second request requesting on-demand PRS transmission, the second request identifying at least one of the one or more alternate PRS configurations, at least one of the one or more alternate PRS parameters, or both; and cause the at least one transceiver to transmit at least one of the one or more on-demand PRS resources according to the at least one of the one or more alternate PRS configurations, the at least one of the one or more alternate PRS parameters, or both.

In an aspect, a location server includes a memory; at least one transceiver; and at least one processor communicatively coupled to the memory and the at least one transceiver, the at least one processor configured to: cause the at least one transceiver to transmit, to a network node, a first request requesting on-demand positioning reference signal (PRS) configurations supported by the network node; receive, via the at least one transceiver, a response from the network node, the response identifying one or more alternate PRS configurations, one or more alternate PRS parameters, or both defining one or more on-demand PRS resources the network node would prefer to transmit during a positioning session between the location server and one or more target UEs; and cause the at least one transceiver to transmit, to the network node, a second request requesting on-demand PRS transmission, the second request identifying at least one of the one or more alternate PRS configurations, at least one of the one or more alternate PRS parameters, or both.

In an aspect, a network node includes means for receiving, from a location server, a first request requesting on-demand positioning reference signal (PRS) configurations supported by the network node; means for transmitting a response to the location server, the response identifying one or more alternate PRS configurations, one or more alternate PRS parameters, or both defining one or more on-demand PRS resources the network node would prefer to transmit during a positioning session between the location server and one or more target UEs; means for receiving, from the location server, a second request requesting on-demand PRS transmission, the second request identifying at least one of the one or more alternate PRS configurations, at least one of the one or more alternate PRS parameters, or both; and means for transmitting at least one of the one or more on-demand PRS resources according to the at least one of the one or more alternate PRS configurations, the at least one of the one or more alternate PRS parameters, or both.

In an aspect, a location server includes means for transmitting, to a network node, a first request requesting on-demand positioning reference signal (PRS) configurations supported by the network node; means for receiving a response from the network node, the response identifying one or more alternate PRS configurations, one or more alternate PRS parameters, or both defining one or more on-demand PRS resources the network node would prefer to transmit during a positioning session between the location server and one or more target UEs; and means for transmitting, to the network node, a second request requesting on-demand PRS transmission, the second request identifying at least one of the one or more alternate PRS configurations, at least one of the one or more alternate PRS parameters, or both.

In an aspect, a non-transitory computer-readable medium storing computer-executable instructions that, when executed by a network node, cause the network node to: receive, from a location server, a first request requesting on-demand positioning reference signal (PRS) configurations supported by the network node; transmit a response to the location server, the response identifying one or more alternate PRS configurations, one or more alternate PRS parameters, or both defining one or more on-demand PRS resources the network node would prefer to transmit during a positioning session between the location server and one or more target UEs; receive, from the location server, a second request requesting on-demand PRS transmission, the second request identifying at least one of the one or more alternate PRS configurations, at least one of the one or more alternate PRS parameters, or both; and transmit at least one of the one or more on-demand PRS resources according to the at least one of the one or more alternate PRS configurations, the at least one of the one or more alternate PRS parameters, or both.

In an aspect, a non-transitory computer-readable medium storing computer-executable instructions that, when executed by a location server, cause the location server to: transmit, to a network node, a first request requesting on-demand positioning reference signal (PRS) configurations supported by the network node; receive a response from the network node, the response identifying one or more alternate PRS configurations, one or more alternate PRS parameters, or both defining one or more on-demand PRS resources the network node would prefer to transmit during a positioning session between the location server and one or more target UEs; and transmit, to the network node, a second request requesting on-demand PRS transmission, the second request identifying at least one of the one or more alternate PRS configurations, at least one of the one or more alternate PRS parameters, or both.

Other objects and advantages associated with the aspects disclosed herein will be apparent to those skilled in the art based on the accompanying drawings and detailed description.

BRIEF DESCRIPTION OF THE DRAWINGS

The accompanying drawings are presented to aid in the description of various aspects of the disclosure and are provided solely for illustration of the aspects and not limitation thereof.

FIG. 8 illustrates various information elements (IEs) that may be used to configure DL-PRS, according to aspects of the disclosure.

FIG. 9 illustrates an example downlink PRS resource IE, according to aspects of the disclosure.

FIGS. 12 and 13 illustrate example methods of positioning, according to aspects of the disclosure.

DETAILED DESCRIPTION

Figure 1:
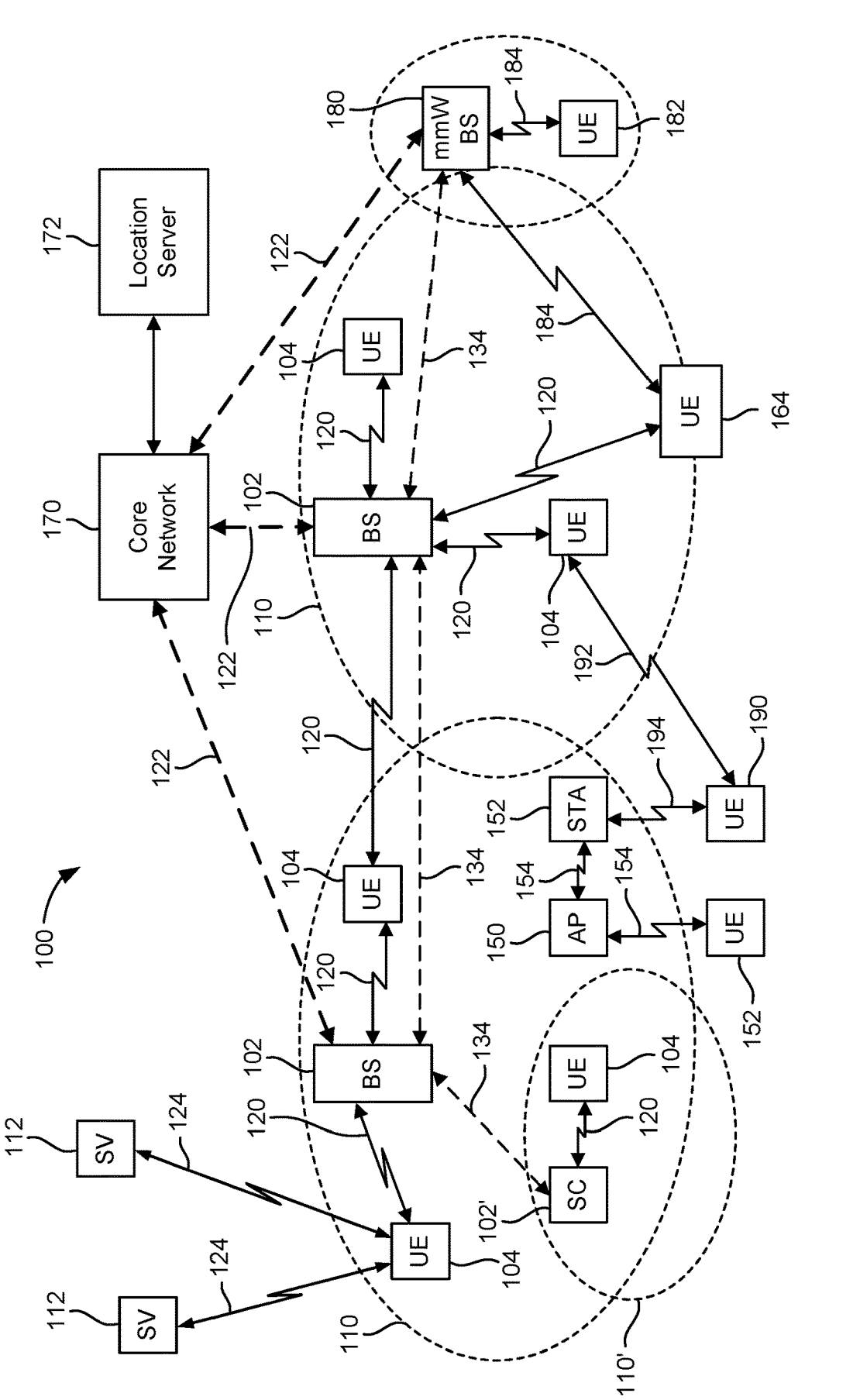
FIG. 1 illustrates an example wireless communications system, according to aspects of the disclosure.

Aspects of the disclosure are provided in the following description and related drawings directed to various examples provided for illustration purposes. Alternate aspects may be devised without departing from the scope of the disclosure. Additionally, well-known elements of the disclosure will not be described in detail or will be omitted so as not to obscure the relevant details of the disclosure.

The words "exemplary" and/or "example" are used herein to mean "serving as an example, instance, or illustration." Any aspect described herein as "exemplary" and/or "example" is not necessarily to be construed as preferred or advantageous over other aspects. Likewise, the term "aspects of the disclosure" does not require that all aspects of the disclosure include the discussed feature, advantage or mode of operation.

Those of skill in the art will appreciate that the information and signals described below may be represented using any of a variety of different technologies and techniques. For example, data, instructions, commands, information, signals, bits, symbols, and chips that may be referenced throughout the description below may be represented by voltages, currents, electromagnetic waves, magnetic fields or particles, optical fields or particles, or any combination thereof, depending in part on the particular application, in part on the desired design, in part on the corresponding technology, etc.

Further, many aspects are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, the sequence(s) of actions described herein can be considered to be embodied entirely within any form of non-transitory computer-readable storage medium having stored therein a corresponding set of computer instructions that, upon execution, would cause or instruct an associated processor of a device to perform the functionality described herein. Thus, the various aspects of the disclosure may be embodied in a number of different forms, all of which have been contemplated to be within the scope of the claimed subject matter. In addition, for each of the aspects described herein, the corresponding form of any such aspects may be described herein as, for example, "logic configured to" perform the described action.

As used herein, the terms "user equipment" (UE) and "base station" are not intended to be specific or otherwise limited to any particular radio access technology (RAT), unless otherwise noted. In general, a UE may be any wireless communication device (e.g., a mobile phone, router, tablet computer, laptop computer, consumer asset locating device, wearable (e.g., smartwatch, glasses, augmented reality (AR)/virtual reality (VR) headset, etc.), vehicle (e.g., automobile, motorcycle, bicycle, etc.), Internet of Things (IoT) device, etc.) used by a user to communicate over a wireless communications network. A UE may be mobile or may (e.g., at certain times) be stationary, and may communicate with a radio access network (RAN). As used herein, the term "UE" may be referred to interchangeably as an "access terminal" or "AT," a "client device," a "wireless device," a "subscriber device," a "subscriber terminal," a "subscriber station," a "user terminal" or "UT," a "mobile device," a "mobile terminal," a "mobile station," or variations thereof. Generally, UEs can communicate with a core network via a RAN, and through the core network the UEs can be connected with external networks such as the Internet and with other UEs. Of course, other mechanisms of connecting to the core network and/or the Internet are also possible for the UEs, such as over wired access networks, wireless local area network (WLAN) networks (e.g., based on the Institute of Electrical and Electronics Engineers (IEEE) 802.11 specification, etc.) and so on.

A base station may operate according to one of several RATs in communication with UEs depending on the network in which it is deployed, and may be alternatively referred to as an access point (AP), a network node, a NodeB, an evolved NodeB (eNB), a next generation eNB (ng-eNB), a New Radio (NR) Node B (also referred to as a gNB or gNodeB), etc. A base station may be used primarily to support wireless access by UEs, including supporting data, voice, and/or signaling connections for the supported UEs. In some systems a base station may provide purely edge node signaling functions while in other systems it may provide additional control and/or network management functions. A communication link through which UEs can send signals to a base station is called an uplink (UL) channel (e.g., a reverse traffic channel, a reverse control channel, an access channel, etc.). A communication link through which the base station can send signals to UEs is called a downlink (DL) or forward link channel (e.g., a paging channel, a control channel, a broadcast channel, a forward traffic channel, etc.). As used herein the term traffic channel (TCH) can refer to either an uplink/reverse or downlink/forward traffic channel.

The term "base station" may refer to a single physical transmission-reception point (TRP) or to multiple physical TRPs that may or may not be co-located. For example, where the term "base station" refers to a single physical TRP, the physical TRP may be an antenna of the base station corresponding to a cell (or several cell sectors) of the base station. Where the term "base station" refers to multiple co-located physical TRPs, the physical TRPs may be an array of antennas (e.g., as in a multiple-input multiple-output (MIMO) system or where the base station employs beamforming) of the base station. Where the term "base station" refers to multiple non-co-located physical TRPs, the physical TRPs may be a distributed antenna system (DAS) (a network of spatially separated antennas connected to a common source via a transport medium) or a remote radio head (RRH) (a remote base station connected to a serving base station). Alternatively, the non-co-located physical TRPs may be the serving base station receiving the measurement report from the UE and a neighbor base station whose reference radio frequency (RF) signals the UE is measuring. Because a TRP is the point from which a base station transmits and receives wireless signals, as used herein, references to transmission from or reception at a base station are to be understood as referring to a particular TRP of the base station.

In some implementations that support positioning of UEs, a base station may not support wireless access by UEs (e.g., may not support data, voice, and/or signaling connections for UEs), but may instead transmit reference signals to UEs to be measured by the UEs, and/or may receive and measure signals transmitted by the UEs. Such a base station may be referred to as a positioning beacon (e.g., when transmitting signals to UEs) and/or as a location measurement unit (e.g., when receiving and measuring signals from UEs).

An "RF signal" comprises an electromagnetic wave of a given frequency that transports information through the space between a transmitter and a receiver. As used herein, a transmitter may transmit a single "RF signal" or multiple "RF signals" to a receiver. However, the receiver may receive multiple "RF signals" corresponding to each transmitted RF signal due to the propagation characteristics of RF signals through multipath channels. The same transmitted RF signal on different paths between the transmitter and receiver may be referred to as a "multipath" RF signal.

FIG. 1 illustrates an example wireless communications system 100, according to aspects of the disclosure. The wireless communications system 100 (which may also be referred to as a wireless wide area network (WWAN)) may include various base stations 102 (labeled "BS") and various UEs 104. The base stations 102 may include macro cell base stations (high power cellular base stations) and/or small cell base stations (low power cellular base stations). In an aspect, the macro cell base stations may include eNBs and/or ng-eNBs where the wireless communications system 100 corresponds to an LTE network, or gNBs where the wireless communications system 100 corresponds to a NR network, or a combination of both, and the small cell base stations may include femtocells, picocells, microcells, etc.

The base stations 102 may collectively form a RAN and interface with a core network 170 (e.g., an evolved packet core (EPC) or a 5G core (5GC)) through backhaul links 122, and through the core network 170 to one or more location servers 172 (e.g., a location management function (LMF) or a secure user plane location (SUPL) location platform (SLP)). The location server(s) 172 may be part of core network 170 or may be external to core network 170. In addition to other functions, the base stations 102 may perform functions that relate to one or more of transferring user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, RAN sharing, multimedia broadcast multicast service (MBMS), subscriber and equipment trace, RAN information management (RIM), paging, positioning, and delivery of warning messages. The base stations 102 may communicate with each other directly or indirectly (e.g., through the EPC/5GC) over backhaul links 134, which may be wired or wireless.

The base stations 102 may wirelessly communicate with the UEs 104. Each of the base stations 102 may provide communication coverage for a respective geographic coverage area 110. In an aspect, one or more cells may be supported by a base station 102 in each geographic coverage area 110. A "cell" is a logical communication entity used for communication with a base station (e.g., over some frequency resource, referred to as a carrier frequency, component carrier, carrier, band, or the like), and may be associated with an identifier (e.g., a physical cell identifier (PCI), an enhanced cell identifier (ECI), a virtual cell identifier (VCI), a cell global identifier (CGI), etc.) for distinguishing cells operating via the same or a different carrier frequency. In some cases, different cells may be configured according to different protocol types (e.g., machine-type communication (MTC), narrowband IoT (NB-IoT), enhanced mobile broadband (eMBB), or others) that may provide access for different types of UEs. Because a cell is supported by a specific base station, the term "cell" may refer to either or both of the logical communication entity and the base station that supports it, depending on the context. In addition, because a TRP is typically the physical transmission point of a cell, the terms "cell" and "TRP" may be used interchangeably. In some cases, the term "cell" may also refer to a geographic coverage area of a base station (e.g., a sector), insofar as a carrier frequency can be detected and used for communication within some portion of geographic coverage areas 110.

While neighboring macro cell base station 102 geographic coverage areas 110 may partially overlap (e.g., in a handover region), some of the geographic coverage areas 110 may be substantially overlapped by a larger geographic coverage area 110. For example, a small cell base station 102' (labeled "SC" for "small cell") may have a geographic coverage area 110' that substantially overlaps with the geographic coverage area 110 of one or more macro cell base stations 102. A network that includes both small cell and macro cell base stations may be known as a heterogeneous network. A heterogeneous network may also include home eNBs (HeNBs), which may provide service to a restricted group known as a closed subscriber group (CSG).

The communication links 120 between the base stations 102 and the UEs 104 may include uplink (also referred to as reverse link) transmissions from a UE 104 to a base station 102 and/or downlink (DL) (also referred to as forward link) transmissions from a base station 102 to a UE 104. The communication links 120 may use MIMO antenna technology, including spatial multiplexing, beamforming, and/or transmit diversity. The communication links 120 may be through one or more carrier frequencies. Allocation of carriers may be asymmetric with respect to downlink and uplink (e.g., more or less carriers may be allocated for downlink than for uplink).

The wireless communications system 100 may further include a wireless local area network (WLAN) access point (AP) 150 in communication with WLAN stations (STAs) 152 via communication links 154 in an unlicensed frequency spectrum (e.g., 5 GHz). When communicating in an unlicensed frequency spectrum, the WLAN STAs 152 and/or the WLAN AP 150 may perform a clear channel assessment (CCA) or listen before talk (LBT) procedure prior to communicating in order to determine whether the channel is available.

The small cell base station 102' may operate in a licensed and/or an unlicensed frequency spectrum. When operating in an unlicensed frequency spectrum, the small cell base station 102' may employ LTE or NR technology and use the same 5 GHz unlicensed frequency spectrum as used by the WLAN AP 150. The small cell base station 102', employing LTE/5G in an unlicensed frequency spectrum, may boost coverage to and/or increase capacity of the access network. NR in unlicensed spectrum may be referred to as NR-U. LTE in an unlicensed spectrum may be referred to as LTE-U, licensed assisted access (LAA), or MulteFire.

The wireless communications system 100 may further include a millimeter wave (mmW) base station 180 that may operate in mmW frequencies and/or near mmW frequencies in communication with a UE 182. Extremely high frequency (EHF) is part of the RF in the electromagnetic spectrum. EHF has a range of 30 GHz to 300 GHz and a wavelength between 1 millimeter and 10 millimeters. Radio waves in this band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band have high path loss and a relatively short range. The mmW base station 180 and the UE 182 may utilize beamforming (transmit and/or receive) over a mmW communication link 184 to compensate for the extremely high path loss and short range. Further, it will be appreciated that in alternative configurations, one or more base stations 102 may also transmit using mmW or near mmW and beamforming. Accordingly, it will be appreciated that the foregoing illustrations are merely examples and should not be construed to limit the various aspects disclosed herein.

Transmit beamforming is a technique for focusing an RF signal in a specific direction. Traditionally, when a network node (e.g., a base station) broadcasts an RF signal, it broadcasts the signal in all directions (omni-directionally). With transmit beamforming, the network node determines where a given target device (e.g., a UE) is located (relative to the transmitting network node) and projects a stronger downlink RF signal in that specific direction, thereby providing a faster (in terms of data rate) and stronger RF signal for the receiving device(s). To change the directionality of the RF signal when transmitting, a network node can control the phase and relative amplitude of the RF signal at each of the one or more transmitters that are broadcasting the RF signal. For example, a network node may use an array of antennas (referred to as a "phased array" or an "antenna array") that creates a beam of RF waves that can be "steered" to point in different directions, without actually moving the antennas. Specifically, the RF current from the transmitter is fed to the individual antennas with the correct phase relationship so that the radio waves from the separate antennas add together to increase the radiation in a desired direction, while cancelling to suppress radiation in undesired directions.

Transmit beams may be quasi-co-located, meaning that they appear to the receiver (e.g., a UE) as having the same parameters, regardless of whether or not the transmitting antennas of the network node themselves are physically co-located. In NR, there are four types of quasi-co-location (QCL) relations. Specifically, a QCL relation of a given type means that certain parameters about a second reference RF signal on a second beam can be derived from information about a source reference RF signal on a source beam. Thus, if the source reference RF signal is QCL Type A, the receiver can use the source reference RF signal to estimate the Doppler shift, Doppler spread, average delay, and delay spread of a second reference RF signal transmitted on the same channel. If the source reference RF signal is QCL Type B, the receiver can use the source reference RF signal to estimate the Doppler shift and Doppler spread of a second reference RF signal transmitted on the same channel. If the source reference RF signal is QCL Type C, the receiver can use the source reference RF signal to estimate the Doppler shift and average delay of a second reference RF signal transmitted on the same channel. If the source reference RF signal is QCL Type D, the receiver can use the source reference RF signal to estimate the spatial receive parameter of a second reference RF signal transmitted on the same channel.

In receive beamforming, the receiver uses a receive beam to amplify RF signals detected on a given channel. For example, the receiver can increase the gain setting and/or adjust the phase setting of an array of antennas in a particular direction to amplify (e.g., to increase the gain level of) the RF signals received from that direction. Thus, when a receiver is said to beamform in a certain direction, it means the beam gain in that direction is high relative to the beam gain along other directions, or the beam gain in that direction is the highest compared to the beam gain in that direction of all other receive beams available to the receiver. This results in a stronger received signal strength (e.g., reference signal received power (RSRP), reference signal received quality (RSRQ), signal-to-interference-plus-noise ratio (SINR), etc.) of the RF signals received from that direction.

Transmit and receive beams may be spatially related. A spatial relation means that parameters for a second beam (e.g., a transmit or receive beam) for a second reference signal can be derived from information about a first beam (e.g., a receive beam or a transmit beam) for a first reference signal. For example, a UE may use a particular receive beam to receive a reference downlink reference signal (e.g., synchronization signal block (SSB)) from a base station. The UE can then form a transmit beam for sending an uplink reference signal (e.g., sounding reference signal (SRS)) to that base station based on the parameters of the receive beam.

Note that a "downlink" beam may be either a transmit beam or a receive beam, depending on the entity forming it. For example, if a base station is forming the downlink beam to transmit a reference signal to a UE, the downlink beam is a transmit beam. If the UE is forming the downlink beam, however, it is a receive beam to receive the downlink reference signal. Similarly, an "uplink" beam may be either a transmit beam or a receive beam, depending on the entity forming it. For example, if a base station is forming the uplink beam, it is an uplink receive beam, and if a UE is forming the uplink beam, it is an uplink transmit beam.

In 5G, the frequency spectrum in which wireless nodes (e.g., base stations 102/180, UEs 104/182) operate is divided into multiple frequency ranges, FR1 (from 450 to 6000 MHz), FR2 (from 24250 to 52600 MHz), FR3 (above 52600 MHz), and FR4 (between FR1 and FR2). mmW frequency bands generally include the FR2, FR3, and FR4 frequency ranges. As such, the terms "mmW" and "FR2" or "FR3" or "FR4" may generally be used interchangeably.

In a multi-carrier system, such as 5G, one of the carrier frequencies is referred to as the "primary carrier" or "anchor carrier" or "primary serving cell" or "PCell," and the remaining carrier frequencies are referred to as "secondary carriers" or "secondary serving cells" or "SCells." In carrier aggregation, the anchor carrier is the carrier operating on the primary frequency (e.g., FR1) utilized by a UE 104/182 and the cell in which the UE 104/182 either performs the initial radio resource control (RRC) connection establishment procedure or initiates the RRC connection re-establishment procedure. The primary carrier carries all common and UE-specific control channels, and may be a carrier in a licensed frequency (however, this is not always the case). A secondary carrier is a carrier operating on a second frequency (e.g., FR2) that may be configured once the RRC connection is established between the UE 104 and the anchor carrier and that may be used to provide additional radio resources. In some cases, the secondary carrier may be a carrier in an unlicensed frequency. The secondary carrier may contain only necessary signaling information and signals, for example, those that are UE-specific may not be present in the secondary carrier, since both primary uplink and downlink carriers are typically UE-specific. This means that different UEs 104/182 in a cell may have different downlink primary carriers. The same is true for the uplink primary carriers. The network is able to change the primary carrier of any UE 104/182 at any time. This is done, for example, to balance the load on different carriers. Because a "serving cell" (whether a PCell or an SCell) corresponds to a carrier frequency/component carrier over which some base station is communicating, the term "cell," "serving cell," "component carrier," "carrier frequency," and the like can be used interchangeably.

For example, still referring to FIG. 1, one of the frequencies utilized by the macro cell base stations 102 may be an anchor carrier (or "PCell") and other frequencies utilized by the macro cell base stations 102 and/or the mmW base station 180 may be secondary carriers ("SCells"). The simultaneous transmission and/or reception of multiple carriers enables the UE 104/182 to significantly increase its data transmission and/or reception rates. For example, two 20 MHz aggregated carriers in a multi-carrier system would theoretically lead to a two-fold increase in data rate (i.e., 40 MHz), compared to that attained by a single 20 MHz carrier.

The wireless communications system 100 may further include a UE 164 that may communicate with a macro cell base station 102 over a communication link 120 and/or the mmW base station 180 over a mmW communication link 184. For example, the macro cell base station 102 may support a PCell and one or more SCells for the UE 164 and the mmW base station 180 may support one or more SCells for the UE 164.

In the example of FIG. 1, one or more Earth orbiting satellite positioning system (SPS) space vehicles (SVs) 112 (e.g., satellites) may be used as an independent source of location information for any of the illustrated UEs (shown in FIG. 1 as a single UE 104 for simplicity). A UE 104 may include one or more dedicated SPS receivers specifically designed to receive SPS signals 124 for deriving geo location information from the SVs 112. An SPS typically includes a system of transmitters (e.g., SVs 112) positioned to enable receivers (e.g., UEs 104) to determine their location on or above the Earth based, at least in part, on signals (e.g., SPS signals 124) received from the transmitters. Such a transmitter typically transmits a signal marked with a repeating pseudo-random noise (PN) code of a set number of chips. While typically located in SVs 112, transmitters may sometimes be located on ground-based control stations, base stations 102, and/or other UEs 104.

The use of SPS signals 124 can be augmented by various satellite-based augmentation systems (SBAS) that may be associated with or otherwise enabled for use with one or more global and/or regional navigation satellite systems. For example an SBAS may include an augmentation system(s) that provides integrity information, differential corrections, etc., such as the Wide Area Augmentation System (WAAS), the European Geostationary Navigation Overlay Service (EGNOS), the Multi-functional Satellite Augmentation System (MSAS), the Global Positioning System (GPS) Aided Geo Augmented Navigation or GPS and Geo Augmented Navigation system (GAGAN), and/or the like. Thus, as used herein, an SPS may include any combination of one or more global and/or regional navigation satellite systems and/or augmentation systems, and SPS signals 124 may include SPS, SPS-like, and/or other signals associated with such one or more SPS.

The wireless communications system 100 may further include one or more UEs, such as UE 190, that connects indirectly to one or more communication networks via one or more device-to-device (D2D) peer-to-peer (P2P) links (referred to as "sidelinks"). In the example of FIG. 1, UE 190 has a D2D P2P link 192 with one of the UEs 104 connected to one of the base stations 102 (e.g., through which UE 190 may indirectly obtain cellular connectivity) and a D2D P2P link 194 with WLAN STA 152 connected to the WLAN AP 150 (through which UE 190 may indirectly obtain WLAN-based Internet connectivity). In an example, the D2D P2P links 192 and 194 may be supported with any well-known D2D RAT, such as LTE Direct (LTE-D), WiFi Direct (WiFi-D), Bluetooth®, and so on.

Figure 2A:
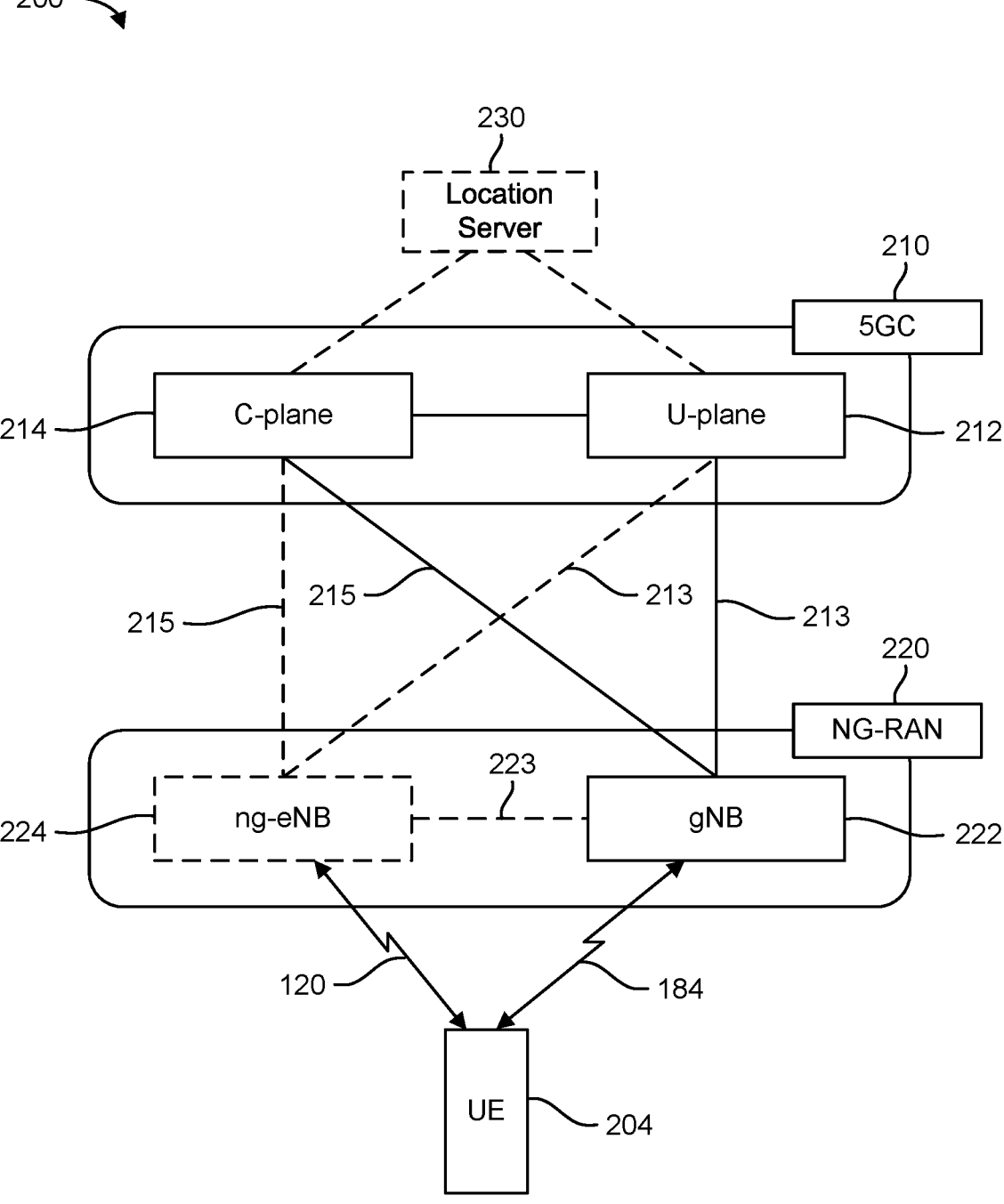
FIGS. 2A and 2B illustrate example wireless network structures, according to aspects of the disclosure.

FIG. 2A illustrates an example wireless network structure 200. For example, a 5GC 210 (also referred to as a Next Generation Core (NGC)) can be viewed functionally as control plane (C-plane) functions 214 (e.g., UE registration, authentication, network access, gateway selection, etc.) and user plane (U-plane) functions 212, (e.g., UE gateway function, access to data networks, IP routing, etc.) which operate cooperatively to form the core network. User plane interface (NG-U) 213 and control plane interface (NG-C) 215 connect the gNB 222 to the 5GC 210 and specifically to the user plane functions 212 and control plane functions 214, respectively. In an additional configuration, an ng-eNB 224 may also be connected to the 5GC 210 via NG-C 215 to the control plane functions 214 and NG-U 213 to user plane functions 212. Further, ng-eNB 224 may directly communicate with gNB 222 via a backhaul connection 223. In some configurations, a Next Generation RAN (NG-RAN) 220 may have one or more gNBs 222, while other configurations include one or more of both ng-eNBs 224 and gNBs 222. Either (or both) gNB 222 or ng-eNB 224 may communicate with one or more UEs 204 (e.g., any of the UEs described herein).

Another optional aspect may include a location server 230, which may be in communication with the 5GC 210 to provide location assistance for UE(s) 204. The location server 230 can be implemented as a plurality of separate servers (e.g., physically separate servers, different software modules on a single server, different software modules spread across multiple physical servers, etc.), or alternately may each correspond to a single server. The location server 230 can be configured to support one or more location services for UEs 204 that can connect to the location server 230 via the core network, 5GC 210, and/or via the Internet (not illustrated). Further, the location server 230 may be integrated into a component of the core network, or alternatively may be external to the core network (e.g., a third party server, such as an original equipment manufacturer (OEM) server or service server).

Figure 2B:
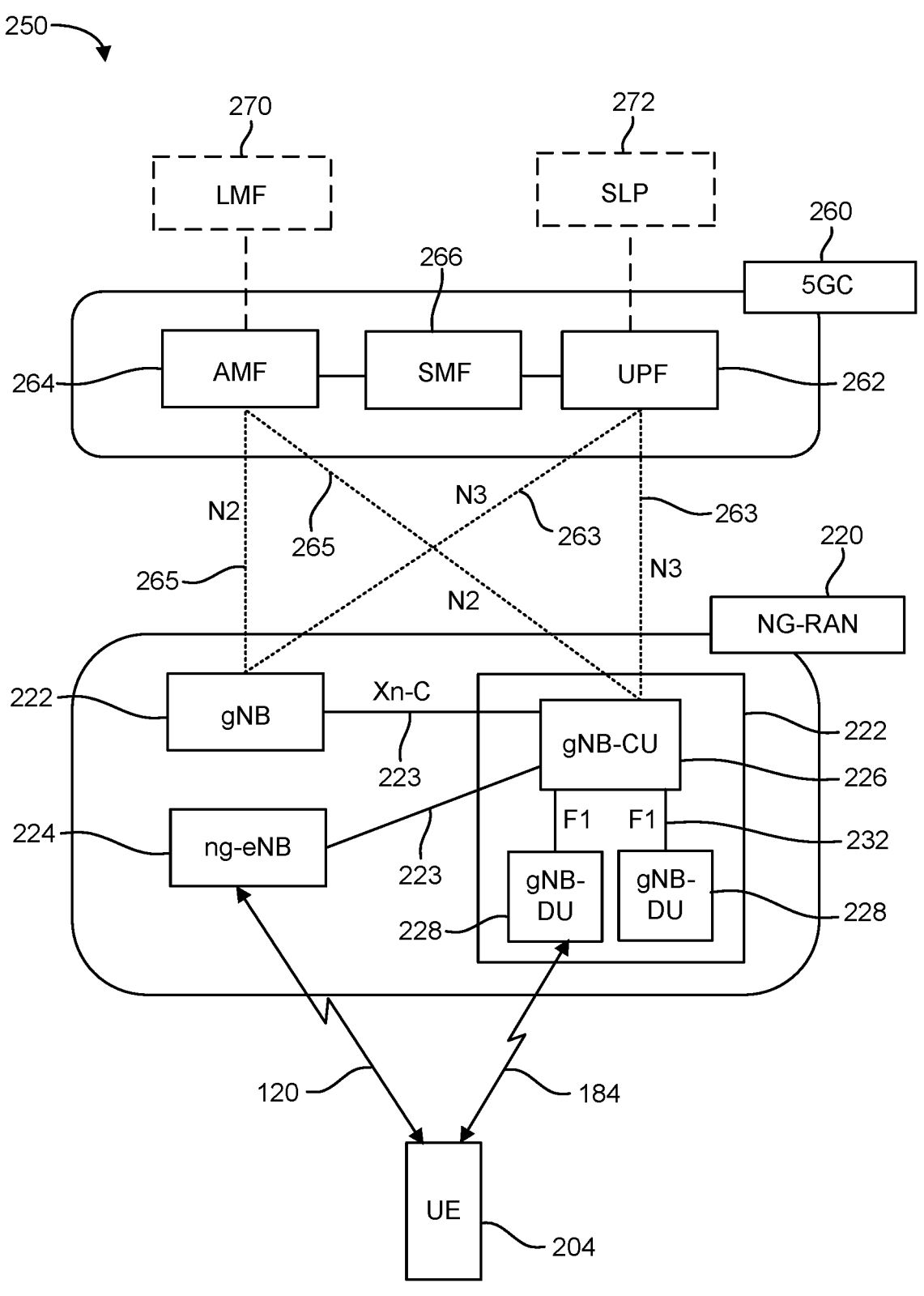

FIG. 2B illustrates another example wireless network structure 250. A 5GC 260 (which may correspond to 5GC 210 in FIG. 2A) can be viewed functionally as control plane functions, provided by an access and mobility management function (AMF) 264, and user plane functions, provided by a user plane function (UPF) 262, which operate cooperatively to form the core network (i.e., 5GC 260). The functions of the AMF 264 include registration management, connection management, reachability management, mobility management, lawful interception, transport for session management (SM) messages between one or more UEs 204 (e.g., any of the UEs described herein) and a session management function (SMF) 266, transparent proxy services for routing SM messages, access authentication and access authorization, transport for short message service (SMS) messages between the UE 204 and the short message service function (SMSF) (not shown), and security anchor functionality (SEAF). The AMF 264 also interacts with an authentication server function (AUSF) (not shown) and the UE 204, and receives the intermediate key that was established as a result of the UE 204 authentication process. In the case of authentication based on a UMTS (universal mobile telecommunications system) subscriber identity module (USIM), the AMF 264 retrieves the security material from the AUSF. The functions of the AMF 264 also include security context management (SCM). The SCM receives a key from the SEAF that it uses to derive access-network specific keys. The functionality of the AMF 264 also includes location services management for regulatory services, transport for location services messages between the UE 204 and a location management function (LMF) 270 (which acts as a location server 230), transport for location services messages between the NG-RAN 220 and the LMF 270, evolved packet system (EPS) bearer identifier allocation for interworking with the EPS, and UE 204 mobility event notification. In addition, the AMF 264 also supports functionalities for non-3GPP (Third Generation Partnership Project) access networks.

Functions of the UPF 262 include acting as an anchor point for intra-/inter-RAT mobility (when applicable), acting as an external protocol data unit (PDU) session point of interconnect to a data network (not shown), providing packet routing and forwarding, packet inspection, user plane policy rule enforcement (e.g., gating, redirection, traffic steering), lawful interception (user plane collection), traffic usage reporting, quality of service (QoS) handling for the user plane (e.g., uplink/downlink rate enforcement, reflective QoS marking in the downlink), uplink traffic verification (service data flow (SDF) to QoS flow mapping), transport level packet marking in the uplink and downlink, downlink packet buffering and downlink data notification triggering, and sending and forwarding of one or more "end markers" to the source RAN node. The UPF 262 may also support transfer of location services messages over a user plane between the UE 204 and a location server, such as an SLP 272.

The functions of the SMF 266 include session management, UE Internet protocol (IP) address allocation and management, selection and control of user plane functions, configuration of traffic steering at the UPF 262 to route traffic to the proper destination, control of part of policy enforcement and QoS, and downlink data notification. The interface over which the SMF 266 communicates with the AMF 264 is referred to as the N11 interface.

Another optional aspect may include an LMF 270, which may be in communication with the 5GC 260 to provide location assistance for UEs 204. The LMF 270 can be implemented as a plurality of separate servers (e.g., physically separate servers, different software modules on a single server, different software modules spread across multiple physical servers, etc.), or alternately may each correspond to a single server. The LMF 270 can be configured to support one or more location services for UEs 204 that can connect to the LMF 270 via the core network, 5GC 260, and/or via the Internet (not illustrated). The SLP 272 may support similar functions to the LMF 270, but whereas the LMF 270 may communicate with the AMF 264, NG-RAN 220, and UEs 204 over a control plane (e.g., using interfaces and protocols intended to convey signaling messages and not voice or data), the SLP 272 may communicate with UEs 204 and external clients (not shown in FIG. 2B) over a user plane (e.g., using protocols intended to carry voice and/or data like the transmission control protocol (TCP) and/or IP).

User plane interface 263 and control plane interface 265 connect the 5GC 260, and specifically the UPF 262 and AMF 264, respectively, to one or more gNBs 222 and/or ng-eNBs 224 in the NG-RAN 220. The interface between gNB(s) 222 and/or ng-eNB(s) 224 and the AMF 264 is referred to as the "N2" interface, and the interface between gNB(s) 222 and/or ng-eNB(s) 224 and the UPF 262 is referred to as the "N3" interface. The gNB(s) 222 and/or ng-eNB(s) 224 of the NG-RAN 220 may communicate directly with each other via backhaul connections 223, referred to as the "Xn-C" interface. One or more of gNBs 222 and/or ng-eNBs 224 may communicate with one or more UEs 204 over a wireless interface, referred to as the "Uu" interface.

The functionality of a gNB 222 is divided between a gNB central unit (gNB-CU) 226 and one or more gNB distributed units (gNB-DUs) 228. The interface 232 between the gNB-CU 226 and the one or more gNB-DUs 228 is referred to as the "F 1" interface. A gNB-CU 226 is a logical node that includes the base station functions of transferring user data, mobility control, radio access network sharing, positioning, session management, and the like, except for those functions allocated exclusively to the gNB-DU(s) 228. More specifically, the gNB-CU 226 hosts the radio resource control (RRC), service data adaptation protocol (SDAP), and packet data convergence protocol (PDCP) protocols of the gNB 222. A gNB-DU 228 is a logical node that hosts the radio link control (RLC), medium access control (MAC), and physical (PHY) layers of the gNB 222. Its operation is controlled by the gNB-CU 226. One gNB-DU 228 can support one or more cells, and one cell is supported by only one gNB-DU 228. Thus, a UE 204 communicates with the gNB-CU 226 via the RRC, SDAP, and PDCP layers and with a gNB-DU 228 via the RLC, MAC, and PHY layers.

Figure 3A:
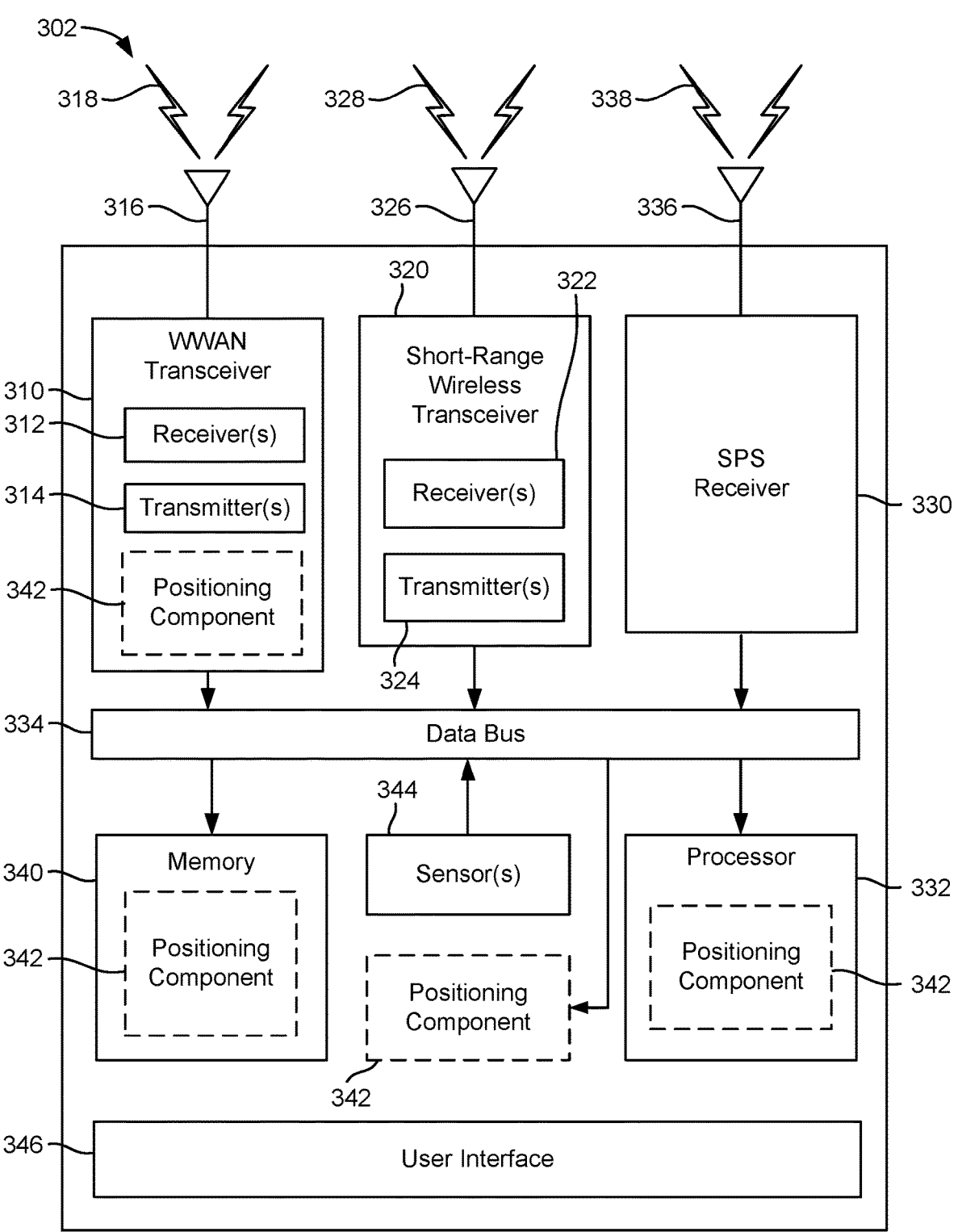
FIGS. 3A, 3B, and 3C are simplified block diagrams of several sample aspects of components that may be employed in a user equipment (UE), a base station, and a network entity, respectively, and configured to support communications as taught herein.
Figure 3B:
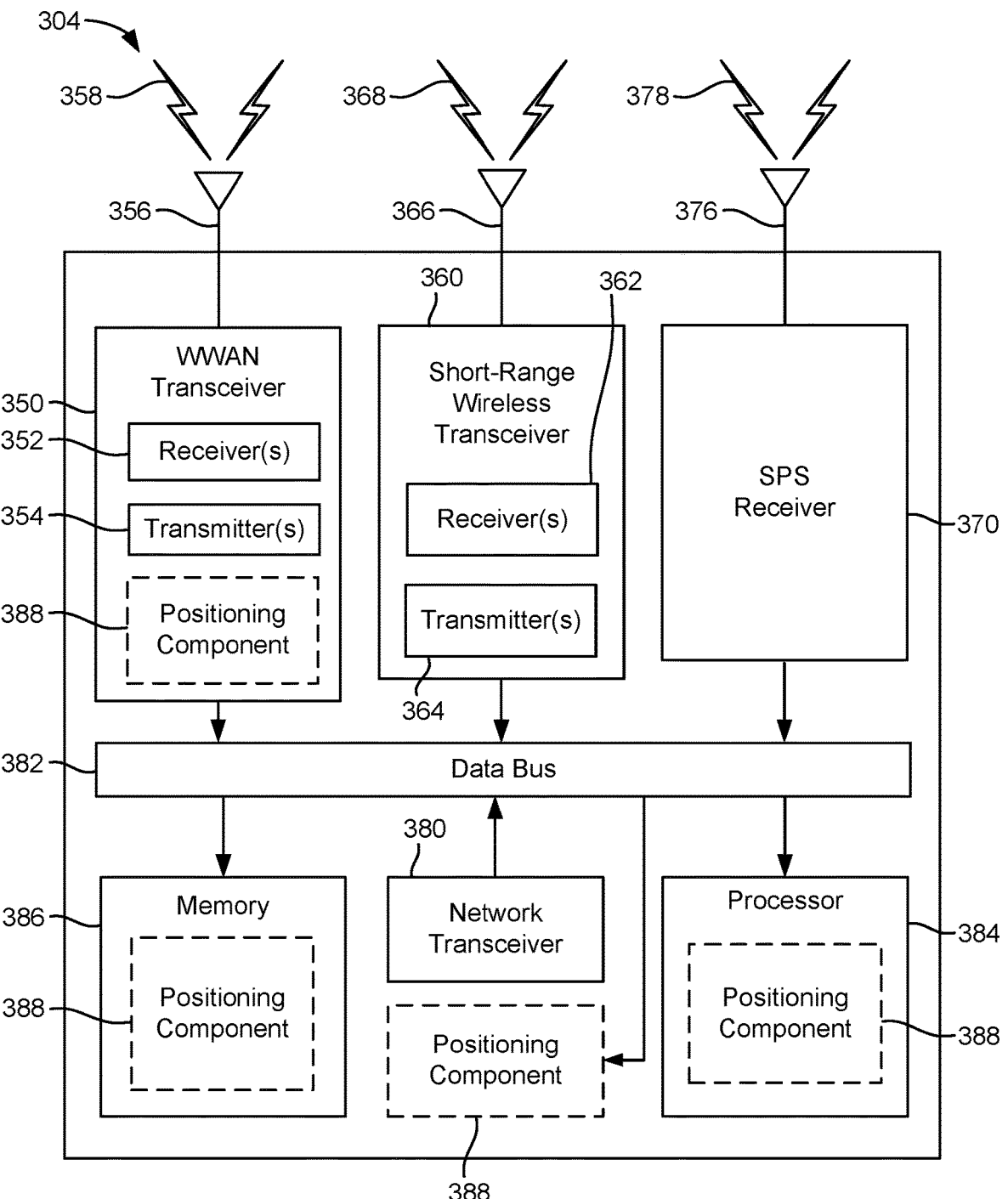
Figure 3C:
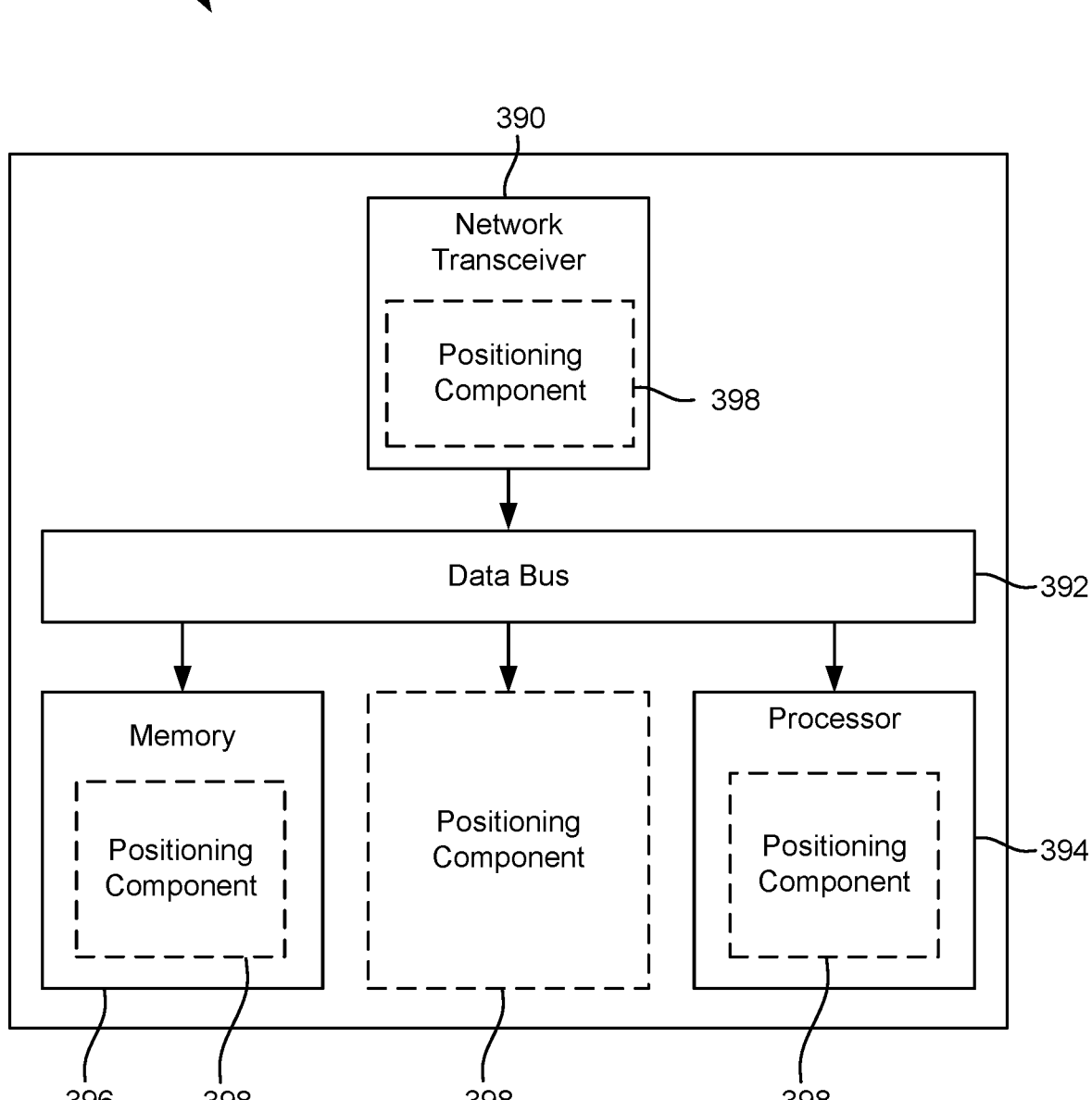

FIGS. 3A, 3B, and 3C illustrate several example components (represented by corresponding blocks) that may be incorporated into a UE 302 (which may correspond to any of the UEs described herein), a base station 304 (which may correspond to any of the base stations described herein), and a network entity 306 (which may correspond to or embody any of the network functions described herein, including the location server 230 and the LMF 270, or alternatively may be independent from the NG-RAN 220 and/or 5GC 210/260 infrastructure depicted in FIGS. 2A and 2B, such as a private network) to support the file transmission operations as taught herein. It will be appreciated that these components may be implemented in different types of apparatuses in different implementations (e.g., in an ASIC, in a system-on-chip (SoC), etc.). The illustrated components may also be incorporated into other apparatuses in a communication system. For example, other apparatuses in a system may include components similar to those described to provide similar functionality. Also, a given apparatus may contain one or more of the components. For example, an apparatus may include multiple transceiver components that enable the apparatus to operate on multiple carriers and/or communicate via different technologies.

The UE 302 and the base station 304 each include one or more wireless wide area network (WWAN) transceivers 310 and 350, respectively, providing means for communicating (e.g., means for transmitting, means for receiving, means for measuring, means for tuning, means for refraining from transmitting, etc.) via one or more wireless communication networks (not shown), such as an NR network, an LTE network, a GSM network, and/or the like. The WWAN transceivers 310 and 350 may each be connected to one or more antennas 316 and 356, respectively, for communicating with other network nodes, such as other UEs, access points, base stations (e.g., eNBs, gNBs), etc., via at least one designated RAT (e.g., NR, LTE, GSM, etc.) over a wireless communication medium of interest (e.g., some set of time/frequency resources in a particular frequency spectrum). The WWAN transceivers 310 and 350 may be variously configured for transmitting and encoding signals 318 and 358 (e.g., messages, indications, information, and so on), respectively, and, conversely, for receiving and decoding signals 318 and 358 (e.g., messages, indications, information, pilots, and so on), respectively, in accordance with the designated RAT. Specifically, the WWAN transceivers 310 and 350 include one or more transmitters 314 and 354, respectively, for transmitting and encoding signals 318 and 358, respectively, and one or more receivers 312 and 352, respectively, for receiving and decoding signals 318 and 358, respectively.

The UE 302 and the base station 304 each also include, at least in some cases, one or more short-range wireless transceivers 320 and 360, respectively. The short-range wireless transceivers 320 and 360 may be connected to one or more antennas 326 and 366, respectively, and provide means for communicating (e.g., means for transmitting, means for receiving, means for measuring, means for tuning, means for refraining from transmitting, etc.) with other network nodes, such as other UEs, access points, base stations, etc., via at least one designated RAT (e.g., WiFi, LTE-D, Bluetooth®, Zigbee®, Z-Wave®, PC5, dedicated short-range communications (DSRC), wireless access for vehicular environments (WAVE), near-field communication (NFC), etc.) over a wireless communication medium of interest. The short-range wireless transceivers 320 and 360 may be variously configured for transmitting and encoding signals 328 and 368 (e.g., messages, indications, information, and so on), respectively, and, conversely, for receiving and decoding signals 328 and 368 (e.g., messages, indications, information, pilots, and so on), respectively, in accordance with the designated RAT. Specifically, the short-range wireless transceivers 320 and 360 include one or more transmitters 324 and 364, respectively, for transmitting and encoding signals 328 and 368, respectively, and one or more receivers 322 and 362, respectively, for receiving and decoding signals 328 and 368, respectively. As specific examples, the short-range wireless transceivers 320 and 360 may be WiFi transceivers, Bluetooth® transceivers, Zigbee® and/or Z-Wave® transceivers, NFC transceivers, or vehicle-to-vehicle (V2V) and/or vehicle-to-everything (V2X) transceivers.

The UE 302 and the base station 304 also include, at least in some cases, satellite positioning systems (SPS) receivers 330 and 370. The SPS receivers 330 and 370 may be connected to one or more antennas 336 and 376, respectively, and may provide means for receiving and/or measuring SPS signals 338 and 378, respectively, such as global positioning system (GPS) signals, global navigation satellite system (GLONASS) signals, Galileo signals, Beidou signals, Indian Regional Navigation Satellite System (NAVIC), Quasi-Zenith Satellite System (QZSS), etc. The SPS receivers 330 and 370 may comprise any suitable hardware and/or software for receiving and processing SPS signals 338 and 378, respectively. The SPS receivers 330 and 370 request information and operations as appropriate from the other systems, and performs calculations necessary to determine positions of the UE 302 and the base station 304 using measurements obtained by any suitable SPS algorithm.

The base station 304 and the network entity 306 each include one or more network transceivers 380 and 390, respectively, providing means for communicating (e.g., means for transmitting, means for receiving, etc.) with other network entities (e.g., other base stations 304, other network entities 306). For example, the base station 304 may employ the network transceiver 380 to communicate with other base stations 304 or network entities 306 over one or more wired or wireless backhaul links. As another example, the network entity 306 may employ the network transceiver 390 to communicate with one or more base station 304 over one or more wired or wireless backhaul links, or with other network entities 306 over one or more wired or wireless core network interfaces.

A transceiver may be configured to communicate over a wired or wireless link. A transceiver (whether a wired transceiver or a wireless transceiver) includes transmitter circuitry (e.g., transmitters 314, 324, 354, 366) and receiver circuitry (e.g., receivers 312, 322, 352, 362). A transceiver may be an integrated device (e.g., embodying transmitter circuitry and receiver circuitry in a single device) in some implementations, may comprise separate transmitter circuitry and separate receiver circuitry in some implementations, or may be embodied in other ways in other implementations. The transmitter circuitry and receiver circuitry of a wired transceiver (e.g., network transceivers 380 and 390 in some implementations) may be coupled to one or more wired network interface ports. Wireless transmitter circuitry (e.g., transmitters 314, 324, 354, 366) may include or be coupled to a plurality of antennas (e.g., antennas 316, 326, 356, 366), such as an antenna array, that permits the respective apparatus (e.g., UE 302, base station 304) to perform transmit "beamforming," as described herein. Similarly, wireless receiver circuitry (e.g., receivers 312, 322, 352, 362) may include or be coupled to a plurality of antennas (e.g., antennas 316, 326, 356, 366), such as an antenna array, that permits the respective apparatus (e.g., UE 302, base station 304) to perform receive beamforming, as described herein. In an aspect, the transmitter circuitry and receiver circuitry may share the same plurality of antennas (e.g., antennas 316, 326, 356, 366), such that the respective apparatus can only receive or transmit at a given time, not both at the same time. A wireless transceiver (e.g., WWAN transceivers 310 and 350, short-range wireless transceivers 320 and 360) may also include a network listen module (NLM) or the like for performing various measurements.

As used herein, the various wireless transceivers (e.g., transceivers 310, 320, 350, and 360, and network transceivers 380 and 390 in some implementations) and wired transceivers (e.g., network transceivers 380 and 390 in some implementations) may generally be characterized as "a transceiver," "at least one transceiver," "one or more transceivers." As such, whether a particular transceiver is a wired or wireless transceiver may be inferred from the type of communication performed. For example, backhaul communication between network devices or servers will generally relate to signaling via a wired transceiver, whereas wireless communication between a UE (e.g., UE 302) and a base station (e.g., base station 304) will generally relate to signaling via a wireless transceiver.

The UE 302, the base station 304, and the network entity 306 also include other components that may be used in conjunction with the operations as disclosed herein. The UE 302, the base station 304, and the network entity 306 include one or more processors 332, 384, and 394, respectively, for providing functionality relating to, for example, wireless communication, and for providing other processing functionality. The processors 332, 384, and 394 may therefore provide means for processing, such as means for determining, means for calculating, means for receiving, means for transmitting, means for indicating, etc. In an aspect, the processors 332, 384, and 394 may include, for example, one or more general purpose processors, multi-core processors, central processing units (CPUs), ASICs, digital signal processors (DSPs), field programmable gate arrays (FPGAs), other programmable logic devices or processing circuitry, or various combinations thereof.

The UE 302, the base station 304, and the network entity 306 include memory circuitry implementing memories 340, 386, and 396 (e.g., each including a memory device), respectively, for maintaining information (e.g., information indicative of reserved resources, thresholds, parameters, and so on). The memories 340, 386, and 396 may therefore provide means for storing, means for retrieving, means for maintaining, etc. In some cases, the UE 302, the base station 304, and the network entity 306 may include positioning components 342, 388, and 398, respectively. The positioning components 342, 388, and 398 may be hardware circuits that are part of or coupled to the processors 332, 384, and 394, respectively, that, when executed, cause the UE 302, the base station 304, and the network entity 306 to perform the functionality described herein. In other aspects, the positioning components 342, 388, and 398 may be external to the processors 332, 384, and 394 (e.g., part of a modem processing system, integrated with another processing system, etc.). Alternatively, the positioning components 342, 388, and 398 may be memory modules stored in the memories 340, 386, and 396, respectively, that, when executed by the processors 332, 384, and 394 (or a modem processing system, another processing system, etc.), cause the UE 302, the base station 304, and the network entity 306 to perform the functionality described herein. FIG. 3A illustrates possible locations of the positioning component 342, which may be, for example, part of the WWAN transceiver 310, the memory 340, the processor 332, or any combination thereof, or may be a standalone component. FIG. 3B illustrates possible locations of the positioning component 388, which may be, for example, part of the WWAN transceiver 350, the memory 386, the processor 384, or any combination thereof, or may be a standalone component. FIG. 3C illustrates possible locations of the positioning component 398, which may be, for example, part of the network transceiver 390, the memory 396, the processor 394, or any combination thereof, or may be a standalone component.

The UE 302 may include one or more sensors 344 coupled to the processor 332 to provide means for sensing or detecting movement and/or orientation information that is independent of motion data derived from signals received by the WWAN transceiver 310, the short-range wireless transceiver 320, and/or the SPS receiver 330. By way of example, the sensor(s) 344 may include an accelerometer (e.g., a micro-electrical mechanical systems (MEMS) device), a gyroscope, a geomagnetic sensor (e.g., a compass), an altimeter (e.g., a barometric pressure altimeter), and/or any other type of movement detection sensor. Moreover, the sensor(s) 344 may include a plurality of different types of devices and combine their outputs in order to provide motion information. For example, the sensor(s) 344 may use a combination of a multi-axis accelerometer and orientation sensors to provide the ability to compute positions in two-dimensional (2D) and/or three-dimensional (3D) coordinate systems.

In addition, the UE 302 includes a user interface 346 providing means for providing indications (e.g., audible and/or visual indications) to a user and/or for receiving user input (e.g., upon user actuation of a sensing device such a keypad, a touch screen, a microphone, and so on). Although not shown, the base station 304 and the network entity 306 may also include user interfaces.

Referring to the processor 384 in more detail, in the downlink, IP packets from the network entity 306 may be provided to the processor 384. The processor 384 may implement functionality for an RRC layer, a packet data convergence protocol (PDCP) layer, a radio link control (RLC) layer, and a medium access control (MAC) layer. The processor 384 may provide RRC layer functionality associated with broadcasting of system information (e.g., master information block (MIB), system information blocks (SIB s)), RRC connection control (e.g., RRC connection paging, RRC connection establishment, RRC connection modification, and RRC connection release), inter-RAT mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer PDUs, error correction through automatic repeat request (ARQ), concatenation, segmentation, and reassembly of RLC service data units (SDUs), re-segmentation of RLC data PDUs, and reordering of RLC data PDUs; and MAC layer functionality associated with mapping between logical channels and transport channels, scheduling information reporting, error correction, priority handling, and logical channel prioritization.

The transmitter 354 and the receiver 352 may implement Layer-1 (L1) functionality associated with various signal processing functions. Layer-1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The transmitter 354 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an orthogonal frequency division multiplexing (OFDM) subcarrier, multiplexed with a reference signal (e.g., pilot) in the time and/or frequency domain, and then combined together using an inverse fast Fourier transform (IFFT) to produce a physical channel carrying a time domain OFDM symbol stream. The OFDM symbol stream is spatially precoded to produce multiple spatial streams. Channel estimates from a channel estimator may be used to determine the coding and modulation scheme, as well as for spatial processing. The channel estimate may be derived from a reference signal and/or channel condition feedback transmitted by the UE 302. Each spatial stream may then be provided to one or more different antennas 356. The transmitter 354 may modulate an RF carrier with a respective spatial stream for transmission.

At the UE 302, the receiver 312 receives a signal through its respective antenna(s) 316. The receiver 312 recovers information modulated onto an RF carrier and provides the information to the processor 332. The transmitter 314 and the receiver 312 implement Layer-1 functionality associated with various signal processing functions. The receiver 312 may perform spatial processing on the information to recover any spatial streams destined for the UE 302. If multiple spatial streams are destined for the UE 302, they may be combined by the receiver 312 into a single OFDM symbol stream. The receiver 312 then converts the OFDM symbol stream from the time-domain to the frequency domain using a fast Fourier transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 304. These soft decisions may be based on channel estimates computed by a channel estimator. The soft decisions are then decoded and de-interleaved to recover the data and control signals that were originally transmitted by the base station 304 on the physical channel. The data and control signals are then provided to the processor 332, which implements Layer-3 (L3) and Layer-2 (L2) functionality.

In the uplink, the processor 332 provides demultiplexing between transport and logical channels, packet reassembly, deciphering, header decompression, and control signal processing to recover IP packets from the core network. The processor 332 is also responsible for error detection.

Similar to the functionality described in connection with the downlink transmission by the base station 304, the processor 332 provides RRC layer functionality associated with system information (e.g., MIB, SIB s) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through hybrid automatic repeat request (HARD), priority handling, and logical channel prioritization.

Channel estimates derived by the channel estimator from a reference signal or feedback transmitted by the base station 304 may be used by the transmitter 314 to select the appropriate coding and modulation schemes, and to facilitate spatial processing. The spatial streams generated by the transmitter 314 may be provided to different antenna(s) 316. The transmitter 314 may modulate an RF carrier with a respective spatial stream for transmission.

The uplink transmission is processed at the base station 304 in a manner similar to that described in connection with the receiver function at the UE 302. The receiver 352 receives a signal through its respective antenna(s) 356. The receiver 352 recovers information modulated onto an RF carrier and provides the information to the processor 384.

In the uplink, the processor 384 provides demultiplexing between transport and logical channels, packet reassembly, deciphering, header decompression, control signal processing to recover IP packets from the UE 302. IP packets from the processor 384 may be provided to the core network. The processor 384 is also responsible for error detection.

For convenience, the UE 302, the base station 304, and/or the network entity 306 are shown in FIGS. 3A, 3B, and 3C as including various components that may be configured according to the various examples described herein. It will be appreciated, however, that the illustrated components may have different functionality in different designs.

The various components of the UE 302, the base station 304, and the network entity 306 may communicate with each other over data buses 334, 382, and 392, respectively. In an aspect, the data buses 334, 382, and 392 may form, or be part of, a communication interface of the UE 302, the base station 304, and the network entity 306, respectively. For example, where different logical entities are embodied in the same device (e.g., gNB and location server functionality incorporated into the same base station 304), the data buses 334, 382, and 392 may provide communication between them.

The components of FIGS. 3A, 3B, and 3C may be implemented in various ways. In some implementations, the components of FIGS. 3A, 3B, and 3C may be implemented in one or more circuits such as, for example, one or more processors and/or one or more ASICs (which may include one or more processors). Here, each circuit may use and/or incorporate at least one memory component for storing information or executable code used by the circuit to provide this functionality. For example, some or all of the functionality represented by blocks 310 to 346 may be implemented by processor and memory component(s) of the UE 302 (e.g., by execution of appropriate code and/or by appropriate configuration of processor components). Similarly, some or all of the functionality represented by blocks 350 to 388 may be implemented by processor and memory component(s) of the base station 304 (e.g., by execution of appropriate code and/or by appropriate configuration of processor components). Also, some or all of the functionality represented by blocks 390 to 398 may be implemented by processor and memory component(s) of the network entity 306 (e.g., by execution of appropriate code and/or by appropriate configuration of processor components). For simplicity, various operations, acts, and/or functions are described herein as being performed "by a UE," "by a base station," "by a network entity," etc. However, as will be appreciated, such operations, acts, and/or functions may actually be performed by specific components or combinations of components of the UE 302, base station 304, network entity 306, etc., such as the processors 332, 384, 394, the transceivers 310, 320, 350, and 360, the memories 340, 386, and 396, the positioning components 342, 388, and 398, etc.

In some designs, the network entity 306 may be implemented as a core network component. In other designs, the network entity 306 may be distinct from a network operator or operation of the cellular network infrastructure (e.g., NG RAN 220 and/or 5GC 210/260). For example, the network entity 306 may be a component of a private network that may be configured to communicate with the UE 302 via the base station 304 or independently from the base station 304 (e.g., over a non-cellular communication link, such as WiFi).

NR supports a number of cellular network-based positioning technologies, including downlink-based, uplink-based, and downlink-and-uplink-based positioning methods. Downlink-based positioning methods include observed time difference of arrival (OTDOA) in LTE, downlink time difference of arrival (DL-TDOA) in NR, and downlink angle-of-departure (DL-AoD) in NR. In an OTDOA or DL-TDOA positioning procedure, a UE measures the differences between the times of arrival (ToAs) of reference signals (e.g., positioning reference signals (PRS)) received from pairs of base stations, referred to as reference signal time difference (RSTD) or time difference of arrival (TDOA) measurements, and reports them to a positioning entity. More specifically, the UE receives the identifiers (IDs) of a reference base station (e.g., a serving base station) and multiple non-reference base stations in assistance data. The UE then measures the RSTD between the reference base station and each of the non-reference base stations. Based on the known locations of the involved base stations and the RSTD measurements, the positioning entity can estimate the UE's location.

For DL-AoD positioning, the positioning entity uses a beam report from the UE of received signal strength measurements of multiple downlink transmit beams to determine the angle(s) between the UE and the transmitting base station(s). The positioning entity can then estimate the location of the UE based on the determined angle(s) and the known location(s) of the transmitting base station(s).

Uplink-based positioning methods include uplink time difference of arrival (UL-TDOA) and uplink angle-of-arrival (UL-AoA). UL-TDOA is similar to DL-TDOA, but is based on uplink reference signals (e.g., sounding reference signals (SRS)) transmitted by the UE. For UL-AoA positioning, one or more base stations measure the received signal strength of one or more uplink reference signals (e.g., SRS) received from a UE on one or more uplink receive beams. The positioning entity uses the signal strength measurements and the angle(s) of the receive beam(s) to determine the angle(s) between the UE and the base station(s). Based on the determined angle(s) and the known location(s) of the base station(s), the positioning entity can then estimate the location of the UE.

Downlink-and-uplink-based positioning methods include enhanced cell-ID (E-CID) positioning and multi-round-trip-time (RTT) positioning (also referred to as "multi-cell RTT"). In an RTT procedure, an initiator (a base station or a UE) transmits an RTT measurement signal (e.g., a PRS or SRS) to a responder (a UE or base station), which transmits an RTT response signal (e.g., an SRS or PRS) back to the initiator. The RTT response signal includes the difference between the ToA of the RTT measurement signal and the transmission time of the RTT response signal, referred to as the reception-to-transmission (Rx–Tx) time difference. The initiator calculates the difference between the transmission time of the RTT measurement signal and the ToA of the RTT response signal, referred to as the transmission-to-reception (Tx–Rx) time difference. The propagation time (also referred to as the "time of flight") between the initiator and the responder can be calculated from the Tx–Rx and Rx–Tx time differences. Based on the propagation time and the known speed of light, the distance between the initiator and the responder can be determined. For multi-RTT positioning, a UE performs an RTT procedure with multiple base stations to enable its location to be determined (e.g., using multilateration) based on the known locations of the base stations. RTT and multi-RTT methods can be combined with other positioning techniques, such as UL-AoA and DL-AoD, to improve location accuracy.

The E-CID positioning method is based on radio resource management (RRM) measurements. In E-CID, the UE reports the serving cell ID, the timing advance (TA), and the identifiers, estimated timing, and signal strength of detected neighbor base stations. The location of the UE is then estimated based on this information and the known locations of the base station(s).

To assist positioning operations, a location server (e.g., location server 230, LMF 270, SLP 272) may provide assistance data to the UE. For example, the assistance data may include identifiers of the base stations (or the cells/TRPs of the base stations) from which to measure reference signals, the reference signal configuration parameters (e.g., the number of consecutive positioning subframes, periodicity of positioning subframes, muting sequence, frequency hopping sequence, reference signal identifier, reference signal bandwidth, etc.), and/or other parameters applicable to the particular positioning method. Alternatively, the assistance data may originate directly from the base stations themselves (e.g., in periodically broadcasted overhead messages, etc.). in some cases, the UE may be able to detect neighbor network nodes itself without the use of assistance data.

In the case of an OTDOA or DL-TDOA positioning procedure, the assistance data may further include an expected RSTD value and an associated uncertainty, or search window, around the expected RSTD. In some cases, the value range of the expected RSTD may be +/−500 microseconds (μs). In some cases, when any of the resources used for the positioning measurement are in FR1, the value range for the uncertainty of the expected RSTD may be +/−32 μs. In other cases, when all of the resources used for the positioning measurement(s) are in FR2, the value range for the uncertainty of the expected RSTD may be +/−8 μs.

A location estimate may be referred to by other names, such as a position estimate, location, position, position fix, or the like. A location estimate may be geodetic and comprise coordinates (e.g., latitude, longitude, and possibly altitude) or may be civic and comprise a street address, postal address, or some other verbal description of a location. A location estimate may further be defined relative to some other known location or defined in absolute terms (e.g., using latitude, longitude, and possibly altitude). A location estimate may include an expected error or uncertainty (e.g., by including an area or volume within which the location is expected to be included with some specified or default level of confidence).

Figure 4A:
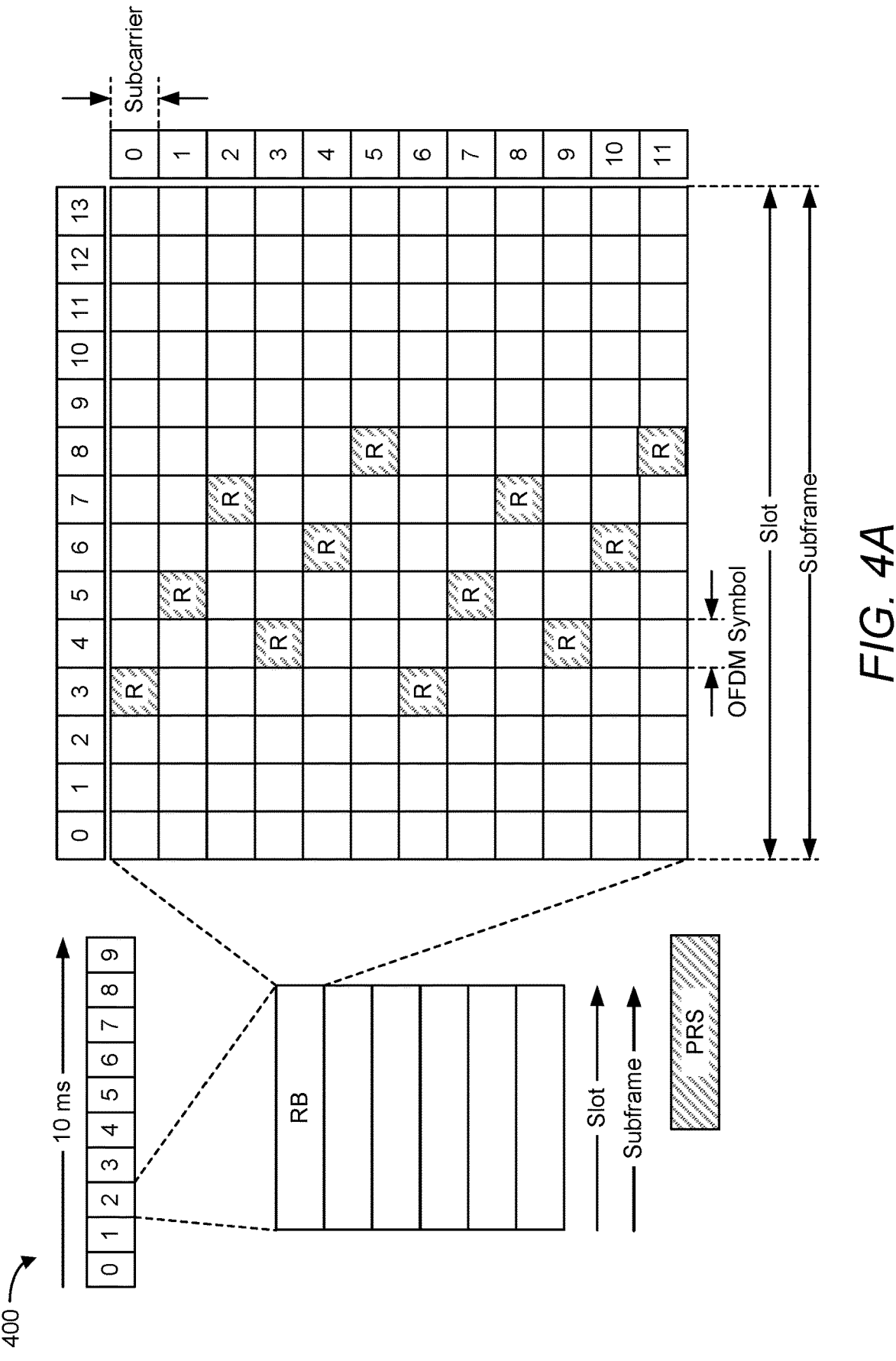
FIGS. 4A and 4B are diagrams illustrating example frame structures and channels within the frame structures, according to aspects of the disclosure.
Figure 4B:
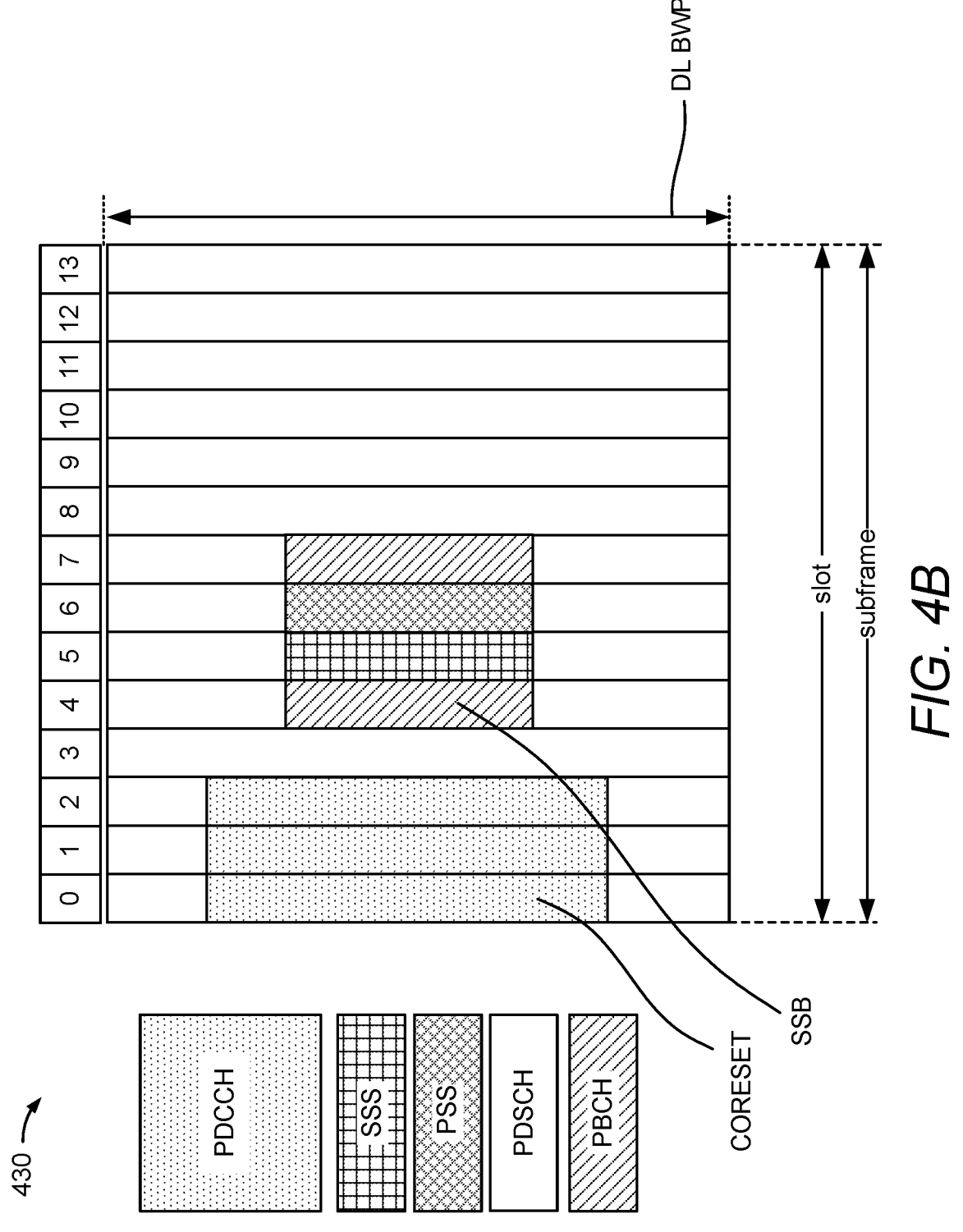

Various frame structures may be used to support downlink and uplink transmissions between network nodes (e.g., base stations and UEs). FIG. 4A is a diagram 400 illustrating an example of a downlink frame structure, according to aspects of the disclosure. FIG. 4B is a diagram 430 illustrating an example of channels within the downlink frame structure, according to aspects of the disclosure. Other wireless communications technologies may have different frame structures and/or different channels.

LTE, and in some cases NR, utilizes OFDM on the downlink and single-carrier frequency division multiplexing (SC-FDM) on the uplink. Unlike LTE, however, NR has an option to use OFDM on the uplink as well. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kilohertz (kHz) and the minimum resource allocation (resource block) may be 12 subcarriers (or 180 kHz). Consequently, the nominal FFT size may be equal to 128, 256, 512, 1024, or 2048 for system bandwidth of 1.25, 2.5, 5, 10, or 20 megahertz (MHz), respectively. The system bandwidth may also be partitioned into subbands. For example, a subband may cover 1.08 MHz (i.e., 6 resource blocks), and there may be 1, 2, 4, 8, or 16 subbands for system bandwidth of 1.25, 2.5, 5, 10, or 20 MHz, respectively.

LTE supports a single numerology (subcarrier spacing (SCS), symbol length, etc.). In contrast, NR may support multiple numerologies ($\mu$), for example, subcarrier spacings of 15 kHz ($\mu$=0), 30 kHz ($\mu$=1), 60 kHz ($\mu$=2), 120 kHz ($\mu$=3), and 240 kHz ($\mu$=4) or greater may be available. In each subcarrier spacing, there are 14 symbols per slot. For 15 kHz SCS ($\mu$=0), there is one slot per subframe, 10 slots per frame, the slot duration is 1 millisecond (ms), the symbol duration is 66.7 microseconds (μs), and the maximum nominal system bandwidth (in MHz) with a 4K FFT size is 50. For 30 kHz SCS ($\mu$=1), there are two slots per subframe, 20 slots per frame, the slot duration is 0.5 ms, the symbol duration is 33.3 μs, and the maximum nominal system bandwidth (in MHz) with a 4K FFT size is 100. For 60 kHz SCS ($\mu$=2), there are four slots per subframe, 40 slots per frame, the slot duration is 0.25 ms, the symbol duration is 16.7 μs, and the maximum nominal system bandwidth (in MHz) with a 4K FFT size is 200. For 120 kHz SCS ($\mu$=3), there are eight slots per subframe, 80 slots per frame, the slot duration is 0.125 ms, the symbol duration is 8.33 μs, and the maximum nominal system bandwidth (in MHz) with a 4K FFT size is 400. For 240 kHz SCS ($\mu$=4), there are 16 slots per subframe, 160 slots per frame, the slot duration is 0.0625 ms, the symbol duration is 4.17 μs, and the maximum nominal system bandwidth (in MHz) with a 4K FFT size is 800.

In the example of FIGS. 4A and 4B, a numerology of 15 kHz is used. Thus, in the time domain, a 10 ms frame is divided into 10 equally sized subframes of 1 ms each, and each subframe includes one time slot. In FIGS. 4A and 4B, time is represented horizontally (on the X axis) with time increasing from left to right, while frequency is represented vertically (on the Y axis) with frequency increasing (or decreasing) from bottom to top.

A resource grid may be used to represent time slots, each time slot including one or more time-concurrent resource blocks (RBs) (also referred to as physical RBs (PRBs)) in the frequency domain. The resource grid is further divided into multiple resource elements (REs). An RE may correspond to one symbol length in the time domain and one subcarrier in the frequency domain. In the numerology of FIGS. 4A and 4B, for a normal cyclic prefix, an RB may contain 12 consecutive subcarriers in the frequency domain and seven consecutive symbols in the time domain, for a total of 84 REs. For an extended cyclic prefix, an RB may contain 12 consecutive subcarriers in the frequency domain and six consecutive symbols in the time domain, for a total of 72 REs. The number of bits carried by each RE depends on the modulation scheme.

Some of the REs carry downlink reference (pilot) signals (DL-RS). The DL-RS may include positioning reference signals (PRS), tracking reference signals (TRS), phase tracking reference signals (PTRS), cell-specific reference signals (CRS), channel state information reference signals (CSI-RS), demodulation reference signals (DMRS), primary synchronization signals (PSS), secondary synchronization signals (SSS), synchronization signal blocks (SSBs), etc. FIG. 4A illustrates example locations of REs carrying PRS (labeled "R").

A collection of resource elements (REs) that are used for transmission of PRS is referred to as a "PRS resource." The collection of resource elements can span multiple PRBs in the frequency domain and 'N' (such as 1 or more) consecutive symbol(s) within a slot in the time domain. In a given OFDM symbol in the time domain, a PRS resource occupies consecutive PRBs in the frequency domain.

The transmission of a PRS resource within a given PRB has a particular comb size (also referred to as the "comb density"). A comb size 'N' represents the subcarrier spacing (or frequency/tone spacing) within each symbol of a PRS resource configuration. Specifically, for a comb size 'N,' PRS are transmitted in every Nth subcarrier of a symbol of a PRB. For example, for comb-4, for each symbol of the PRS resource configuration, REs corresponding to every fourth subcarrier (such as subcarriers 0, 4, 8) are used to transmit PRS of the PRS resource. Currently, comb sizes of comb-2, comb-4, comb-6, and comb-12 are supported for DL-PRS. FIG. 4A illustrates an example PRS resource configuration for comb-6 (which spans six symbols). That is, the locations of the shaded REs (labeled "R") indicate a comb-6 PRS resource configuration.

Currently, a DL-PRS resource may span 2, 4, 6, or 12 consecutive symbols within a slot with a fully frequency-domain staggered pattern. A DL-PRS resource can be configured in any higher layer configured downlink or flexible (FL) symbol of a slot. There may be a constant energy per resource element (EPRE) for all REs of a given DL-PRS resource. The following are the frequency offsets from symbol to symbol for comb sizes 2, 4, 6, and 12 over 2, 4, 6, and 12 symbols. 2-symbol comb-2: {0, 1}; 4-symbol comb-2: {0, 1, 0, 1}; 6-symbol comb-2: {0, 1, 0, 1, 0, 1}; 12-symbol comb-2: {0, 1, 0, 1, 0, 1, 0, 1, 0, 1, 0, 1}; 4-symbol comb-4: {0, 2, 1, 3}; 12-symbol comb-4: {0, 2, 1, 3, 0, 2, 1, 3, 0, 2, 1, 3}; 6-symbol comb-6: {0, 3, 1, 4, 2, 5}; 12-symbol comb-6: {0, 3, 1, 4, 2, 5, 0, 3, 1, 4, 2, 5}; and 12-symbol comb-12: {0, 6, 3, 9, 1, 7, 4, 10, 2, 8, 5, 11}.

A "PRS resource set" is a set of PRS resources used for the transmission of PRS signals, where each PRS resource has a PRS resource ID. In addition, the PRS resources in a PRS resource set are associated with the same TRP. A PRS resource set is identified by a PRS resource set ID and is associated with a particular TRP (identified by a TRP ID). In addition, the PRS resources in a PRS resource set have the same periodicity, a common muting pattern configuration, and the same repetition factor (such as "PRS-ResourceRepetitionFactor") across slots. The periodicity is the time from the first repetition of the first PRS resource of a first PRS instance to the same first repetition of the same first PRS resource of the next PRS instance. The periodicity may have a length selected from $2^1.*\{4, 5, 8, 10, 16, 20, 32, 40, 64, 80, 160, 320, 640, 1280, 2560, 5120, 10240\}$ slots, with $\mu=0, 1, 2, 3$. The repetition factor may have a length selected from {1, 2, 4, 6, 8, 16, 32} slots.

A PRS resource ID in a PRS resource set is associated with a single beam (or beam ID) transmitted from a single TRP (where a TRP may transmit one or more beams). That is, each PRS resource of a PRS resource set may be transmitted on a different beam, and as such, a "PRS resource," or simply "resource," also can be referred to as a "beam." Note that this does not have any implications on whether the TRPs and the beams on which PRS are transmitted are known to the UE.

A "PRS instance" or "PRS occasion" is one instance of a periodically repeated time window (such as a group of one or more consecutive slots) where PRS are expected to be transmitted. A PRS occasion also may be referred to as a "PRS positioning occasion," a "PRS positioning instance, a "positioning occasion," "a positioning instance," a "positioning repetition," or simply an "occasion," an "instance," or a "repetition."

A "positioning frequency layer" (also referred to simply as a "frequency layer") is a collection of one or more PRS resource sets across one or more TRPs that have the same values for certain parameters. Specifically, the collection of PRS resource sets has the same subcarrier spacing and cyclic prefix (CP) type (meaning all numerologies supported for the physical downlink shared channel (PDSCH) are also supported for PRS), the same Point A, the same value of the downlink PRS bandwidth, the same start PRB (and center frequency), and the same comb-size. The Point A parameter takes the value of the parameter "ARFCN-ValueNR" (where "ARFCN" stands for "absolute radio-frequency channel number") and is an identifier/code that specifies a pair of physical radio channel used for transmission and reception. The downlink PRS bandwidth may have a granularity of four PRBs, with a minimum of 24 PRBs and a maximum of 272 PRBs. Currently, up to four frequency layers have been defined, and up to two PRS resource sets may be configured per TRP per frequency layer.

The concept of a frequency layer is somewhat like the concept of component carriers and bandwidth parts (BWPs), but different in that component carriers and BWPs are used by one base station (or a macro cell base station and a small cell base station) to transmit data channels, while frequency layers are used by several (usually three or more) base stations to transmit PRS. A UE may indicate the number of frequency layers it can support when it sends the network its positioning capabilities, such as during an LTE positioning protocol (LPP) session. For example, a UE may indicate whether it can support one or four positioning frequency layers.

FIG. 4B illustrates an example of various channels within a downlink slot of a radio frame. In NR, the channel bandwidth, or system bandwidth, is divided into multiple BWPs. A BWP is a contiguous set of PRBs selected from a contiguous subset of the common RBs for a given numerology on a given carrier. Generally, a maximum of four BWPs can be specified in the downlink and uplink. That is, a UE can be configured with up to four BWPs on the downlink, and up to four BWPs on the uplink. Only one BWP (uplink or downlink) may be active at a given time, meaning the UE may only receive or transmit over one BWP at a time. On the downlink, the bandwidth of each BWP should be equal to or greater than the bandwidth of the SSB, but it may or may not contain the SSB.

Referring to FIG. 4B, a primary synchronization signal (PSS) is used by a UE to determine subframe/symbol timing and a physical layer identity. A secondary synchronization signal (SSS) is used by a UE to determine a physical layer cell identity group number and radio frame timing. Based on the physical layer identity and the physical layer cell identity group number, the UE can determine a PCI. Based on the PCI, the UE can determine the locations of the aforementioned DL-RS. The physical broadcast channel (PBCH), which carries an MIB, may be logically grouped with the PSS and SSS to form an SSB (also referred to as an SS/PBCH). The MIB provides a number of RBs in the downlink system bandwidth and a system frame number (SFN). The PDSCH carries user data, broadcast system information not transmitted through the PBCH, such as system information blocks (SIGs), and paging messages.

The physical downlink control channel (PDCCH) carries downlink control information (DCI) within one or more control channel elements (CCEs), each CCE including one or more RE group (REG) bundles (which may span multiple symbols in the time domain), each REG bundle including one or more REGs, each REG corresponding to 12 resource elements (one resource block) in the frequency domain and one OFDM symbol in the time domain. The set of physical resources used to carry the PDCCH/DCI is referred to in NR as the control resource set (CORESET). In NR, a PDCCH is confined to a single CORESET and is transmitted with its own DMRS. This enables UE-specific beamforming for the PDCCH.

In the example of FIG. 4B, there is one CORESET per BWP, and the CORESET spans three symbols (although it may be only one or two symbols) in the time domain. Unlike LTE control channels, which occupy the entire system bandwidth, in NR, PDCCH channels are localized to a specific region in the frequency domain (i.e., a CORESET). Thus, the frequency component of the PDCCH shown in FIG. 4B is illustrated as less than a single BWP in the frequency domain. Note that although the illustrated CORESET is contiguous in the frequency domain, it need not be. In addition, the CORESET may span less than three symbols in the time domain.

The DCI within the PDCCH carries information about uplink resource allocation (persistent and non-persistent) and descriptions about downlink data transmitted to the UE, referred to as uplink and downlink grants, respectively. More specifically, the DCI indicates the resources scheduled for the downlink data channel (e.g., PDSCH) and the uplink data channel (e.g., physical uplink shared channel (PUSCH)). Multiple (e.g., up to eight) DCIs can be configured in the PDCCH, and these DCIs can have one of multiple formats. For example, there are different DCI formats for uplink scheduling, for downlink scheduling, for uplink transmit power control (TPC), etc. A PDCCH may be transported by 1, 2, 4, 8, or 16 CCEs in order to accommodate different DCI payload sizes or coding rates.

Note that the terms "positioning reference signal" and "PRS" generally refer to specific reference signals that are used for positioning in NR and LTE systems. However, as used herein, the terms "positioning reference signal" and "PRS" may also refer to any type of reference signal that can be used for positioning, such as but not limited to, PRS as defined in LTE and NR, TRS, PTRS, CRS, CSI-RS, DMRS, PSS, SSS, SSB, SRS, UL-PRS, etc. In addition, the terms "positioning reference signal" and "PRS" may refer to downlink or uplink positioning reference signals, unless otherwise indicated by the context. If needed to further distinguish the type of PRS, a downlink positioning reference signal may be referred to as a "DL-PRS," and an uplink positioning reference signal (e.g., an SRS-for-positioning, PTRS) may be referred to as an "UL-PRS." In addition, for signals that may be transmitted in both the uplink and downlink (e.g., DMRS, PTRS), the signals may be prepended with "UL" or "DL" to distinguish the direction. For example, "UL-DMRS" may be differentiated from "DL-DMRS."

DL-PRS transmitted for the NR positioning procedures described above can be transmitted periodically or on-demand. "On-demand" PRS transmission means that PRS are only transmitted when there is a request for PRS to be transmitted, as opposed to base stations in the network periodically transmitting PRS regardless of whether there are any ongoing positioning sessions. The on-demand PRS may themselves be periodic within a predefined time period (e.g., during the positioning session), semi-persistent, or aperiodic. As will be appreciated, the use of on-demand PRS transmission reduces PRS overhead. In some cases, on-demand PRS transmission may be requested by a UE, such as for a UE-based positioning procedure (in which the UE estimates its own location) or a UE-requested positioning procedure (in which the UE requests the network to estimate the UE's location). The UE may send a request to receive DL-PRS from and/or transmit UL-PRS to each base station involved in the positioning procedure, or send the request to its serving base station or the location server, which then forwards the request to the involved base stations. In other cases, on-demand PRS transmission may be requested by the network (e.g., location server 230, LMF 270, SLP 272), such as for a UE-assisted positioning procedure (in which the network estimates the UE's location, either of its own initiative or on request from the UE or another entity). In this case, the location server can send the request to the involved base stations.

For an on-demand PRS request made by the target UE (i.e., the UE to be positioned), possible parameters within the request include the bandwidth, periodicity, number of occasions, comb density, and/or QCL/beam directions of the requested PRS. The parameters may also include the desired positioning accuracy, the desired application (e.g., V2V, enhanced 911 (e911), etc.), and/or the like. The target UE may make the request via RRC and/or MAC control element (MAC-CE) signaling, or via scheduling request (SR) or beam failure recovery request (BFRQ)-type signaling. MAC-CE signaling may index into an RRC-configured parameter combination table. In this case, the UE needs a PUSCH assignment to send the request. For SR-type signaling (an SR is a special physical layer message for a UE to ask the network to send an uplink grant so that the UE can transmit a PUSCH), an SR identifier may be associated with a parameter set. Using SR-type signaling may reduce latency compared to MAC-CE signaling (based on the SR periodicity).

For the network response to the target UE's request, the base station's receipt of the request may implicitly trigger the transmission of DL-PRS (e.g., for certain application types). Alternatively, the base station may configure or trigger DL-PRS via explicit signaling to the UE. The signaling may be RRC, MAC-CE, and/or DCI signaling. in the interest of compact signaling, the response can refer to the parameters in the request (e.g., a one-bit acknowledgment per parameter or for the whole request).

The deactivation of on-demand PRS can be accomplished by UE request, in response to reception of a UE measurement report based on the on-demand PRS, automatically based on the PRS configuration (e.g., after 'N' PRS occasions), or by base station signaling.

Another type of on-demand PRS request is a request via physical random access channel (PRACH). In this case, rather than using a PRACH sequence to perform a random access procedure for initial network access, PRS parameter combinations can be associated with PRACH sequences (as indicated in SIB s). Thus, the UE can request a specific on-demand PRS configuration by transmitting the PRACH sequence associated with that PRS configuration.

There are different options for how the network can respond to a UE's PRACH request for on-demand PRS. As a first option, the base station can transmit a SIB update carrying information about the PRS configuration. The PRS may be time-limited, meaning the UE does not need to monitor for further SIB updates indicating deactivation. Such a SIB update would be heard by all UEs, not just the requesting UE. This eliminates the need for a random access response (RAR), but is preferable only for lower priority requests. As a second option, the base station can send an RAR indicating the PRS configuration. Alternatively, the base station cam employ an RAR, PRACH Message 3, PRACH Message 4, or an acknowledgment procedure with the UE to determine the PRS configuration.

Figure 5:
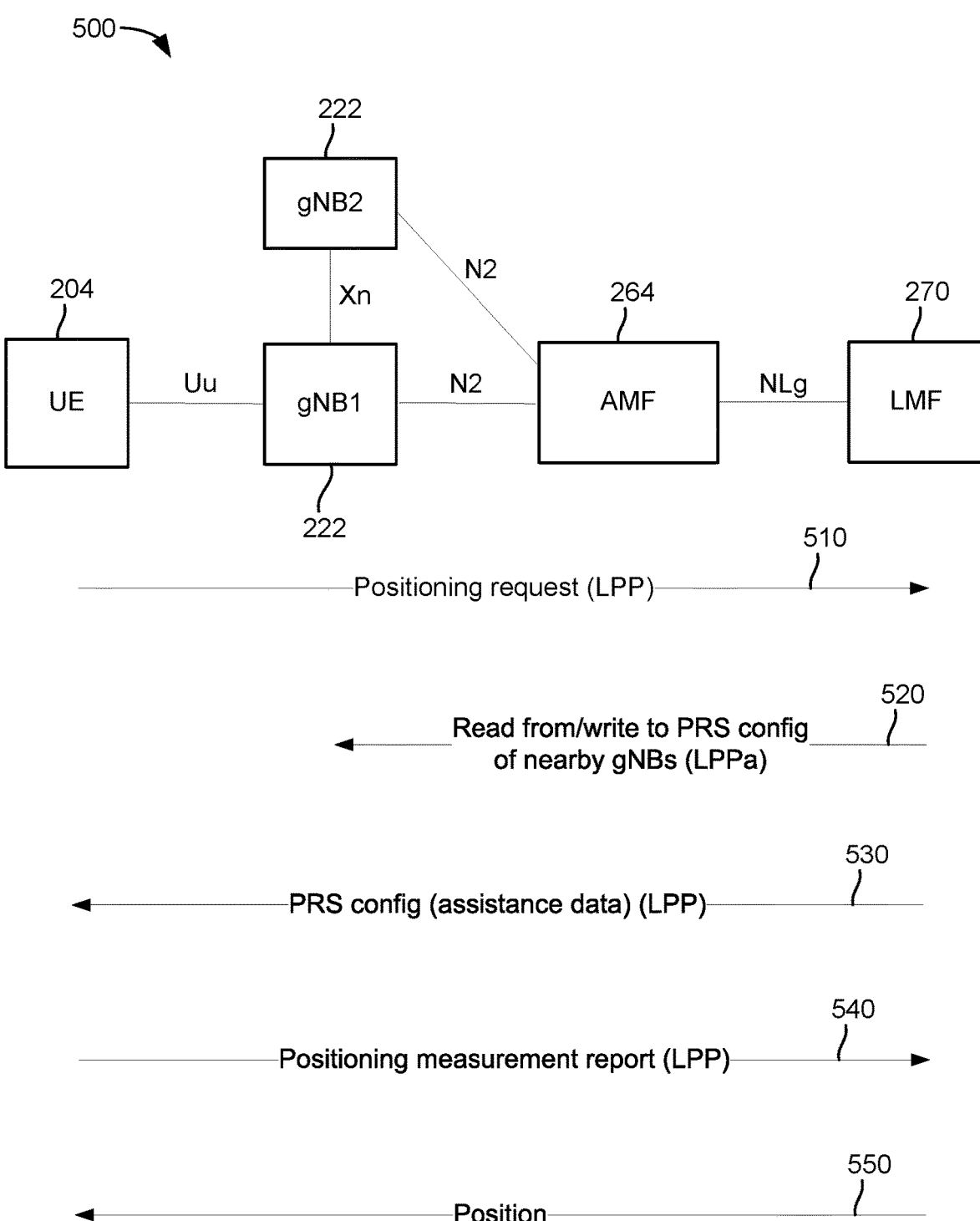
FIG. 5 illustrates an example of a location server-based on-demand positioning reference signal (PRS) configuration request procedure 500, according to aspects of the disclosure.

A request for PRS can also be made over LTE positioning protocol (LPP) signaling between the target UE and a location server (e.g., LMF 270). FIG. 5 illustrates an example of a location server-based on-demand PRS configuration request procedure 500, according to aspects of the disclosure. At stage 510, a target UE 204 transmits a positioning request to the serving LMF 270 via LPP signaling. The positioning request may include a measurement report. The positioning request may also include additional information to allow for a more customized PRS configuration (e.g., requested PRS configuration parameters), which can reduce PRS overhead.

At stage 520, the LMF 270 sends a PRS configuration (based on the requested PRS configuration parameters, if received in the request at stage 510) to gNB(s) 222 nearby (i.e., within wireless communication range of) the target UE 204. The LMF 270 may send the PRS configuration to the gNB(s) 222 in LPP type A (LPPa) or NR positioning protocol type A (NRPPa) signaling. The PRS configuration sent at stage 520 activates the on-demand PRS at the gNB(s) 222.

At stage 530, the LMF 270 sends the on-demand PRS configuration to the UE 204 via LPP signaling. The UE 204 can then perform one or more positioning measurements (e.g., ToA, RSTD, RSRP, Rx–Tx time difference measurements) of the on-demand PRS as part of a UE-assisted positioning procedure (e.g., RTT, DL-TDOA, DL-AoD, etc.). At stage 540, the UE 204 sends a positioning measurement report to the LMF 270 via LPP signaling. The positioning measurement report includes the measurements of the on-demand PRS. Based on the positioning measurement report and the known locations of the involved gNB(s) 222, the LMF 270 calculates the position of the UE 204. At stage 550, the LMF 270 sends the position estimate to the UE 204.

In the above procedure, semi-static parameters, such as the desired accuracy or the PRS bandwidth, but not dynamic parameters, such as the beam identities, can be easily carried in the LPP signaling. There is a high signaling overhead to transmit dynamic parameters between the UE 204 and the LMF 270, and the LMF 270 may have difficulty using the information. There are, however, options for dynamic signaling of customized PRS, which will be discussed below.

Figure 6A:
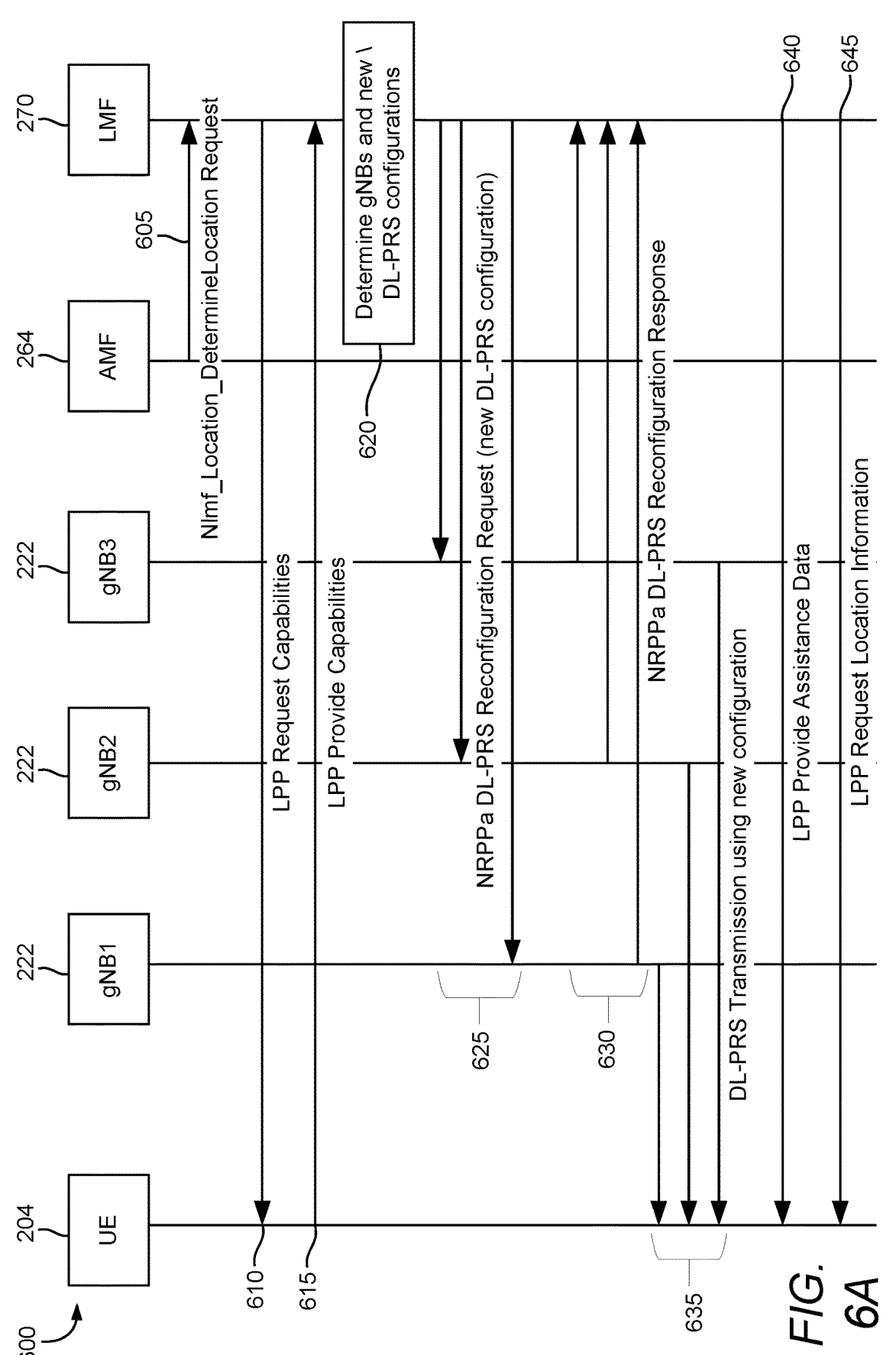
FIGS. 6A and 6B illustrate an example of a location server-initiated on-demand PRS positioning procedure, according to aspects of the disclosure.
Figure 6B:
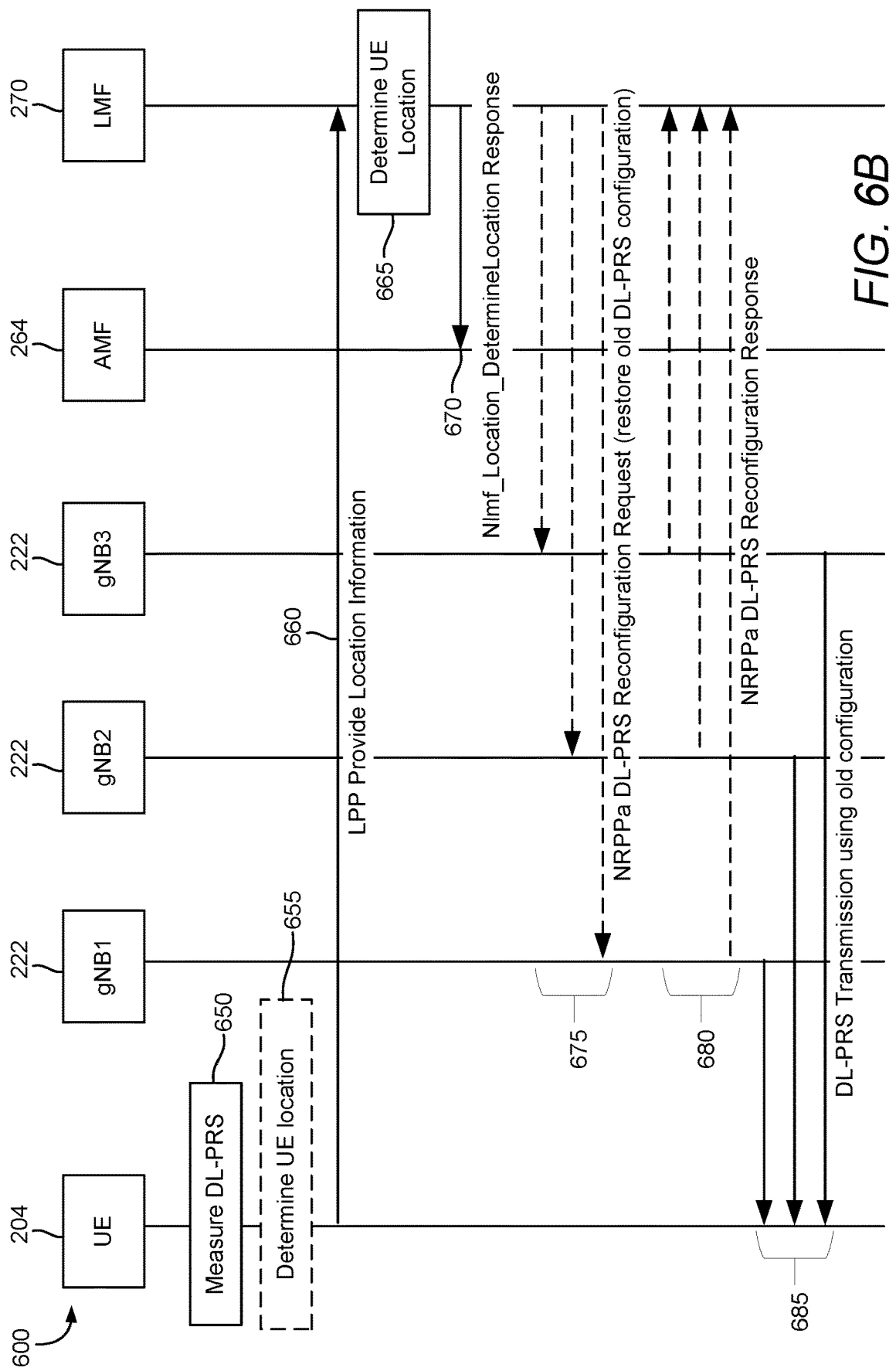

FIG. 5 illustrated a UE-initiated on-demand PRS configuration request procedure. FIGS. 6A and 6B illustrate an example of a location server-initiated on-demand PRS positioning procedure 600, according to aspects of the disclosure. At stage 605, the serving AMF 264 for a target UE 204 invokes a service operation (e.g., a "Nlmf_Location_DetermineLocation" service operation) towards the UE's 204 LMF 270 to request the current location of the UE 204. The service operation includes the UE's 204 serving cell identity, the location services (LCS) client type (e.g., an emergency services client type or a commercial client type), and may include a required QoS.

At stage 610, the LMF 270 sends an LPP Request Capabilities message to the target UE to request the positioning capabilities of the UE 204. At stage 615, the UE 204 returns an LPP Provide Capabilities message to the LMF 270 to provide the positioning capabilities of the UE 204. The positioning capabilities include the DL-PRS measurement capabilities of the UE 204.

At stage 620, based on the LCS client type, the QoS (if provided at stage 605), and the DL-PRS measurement capabilities of the UE 204 (received at stage 615), the LMF 270 determines gNBs 222 nearby to the location of the UE 204 (e.g., as indicated by the serving cell identity received at stage 605) to be measured by the UE 204 and a new DL-PRS configuration (for the requested on-demand PRS) for each of the gNBs 222. The determination at stage 620 may also be based on location requests for other UEs 204 nearby to the target UE 204, which are received by the LMF 270 at about the same time. The new DL-PRS configuration for each gNB 222 may use increased DL-PRS bandwidth, a longer duration of DL-PRS positioning occasions, DL-PRS transmission on new frequencies, a higher frequency of DL-PRS positioning occasions, and/or the like. The DL-PRS configuration may be selected from a set of one or more preconfigured sets of DL-PRS configuration parameters to support increased DL-PRS transmission. In the case of directional DL-PRS beams, the LMF 270 may determine directional DL-PRS beams for each gNB 222 that should be received by the target UE 204. The directional DL-PRS beams may be selected by the LMF 270 according to a known approximate location for the target UE 270 (e.g., as given by the serving cell identity provided in stage 605).

At stage 625, the LMF 270 sends an NRPPa DL-PRS Reconfiguration Request message to each of the gNBs 222 determined at stage 620 and includes the new DL-PRS configuration (for on-demand PRS) determined for that gNB 222. The request may also include a start time for each new DL-PRS configuration and a duration.

At stage 630, each of the gNBs 222 returns a response to the LMF 270 indicating whether the new DL-PRS configuration can be supported. If some gNBs 222 indicate that the new DL-PRS configuration cannot be supported, the LMF 270 may perform stages 675 and 680 to restore the old DL-PRS configurations in each of the gNBs 222 that indicated a new DL-PRS configuration can be supported in order to avoid interference between gNBs 222 that support the new DL-PRS configuration and gNBs 222 that do not. In this case, the LMF 270 would provide the old DL-PRS configurations to the UE 204 at stage 640 instead of the new DL-PRS configurations. At stage 635, the gNBs 222 transmit the DL-PRS using the new configuration.

At stage 640, the LMF 270 sends an LPP Provide Assistance Data message to the UE 204. The LPP Provide Assistance Data message includes the new (on-demand) PRS configuration. At stage 645, the LMF 270 sends an LPP Request Location Information message to the UE 204. The LPP Request Location Information message instructs the UE 204 to measure and report the DL-PRS from the nearby gNBs 222. As such, at stage 650, the UE 204 measures the DL-PRS from the nearby gNBs 222. For example, the UE 204 may measure the ToA, RSRP, RSTD, Rx–Tx time difference, etc. of the DL-PRS from the gNBs 222. At stage 655, the UE 204 optionally determines a location of the UE 204 (for UE-based positioning).

At stage 660, the UE 204 sends an LPP Provide Location Information message to the LMF 270. The LPP Provide Location Information message includes the measurements of the DL-PRS performed at stage 650. At 665, the LMF 270 determines a location of the UE 204 based on the measurements in the LPP Provide Location Information message and the known locations of the gNBs 222. At 670, the LMF 270 sends the determined location of the UE 204 to the AMF 264 (e.g., in an "Nlmf_Location_DetermineLocation Response message).

At 675, the LMF 270 sends an NRPPa DL-PRS Reconfiguration Request message to the gNBs 222 to instruct them to restore the old (previous non-on-demand) DL-PRS configuration. At stage 680, the gNBs 222 send NRPPa DL-PRS Reconfiguration Response messages to the LMF 270 to indicate successful (or unsuccessful) reconfiguration of the DL-PRS. At 685, the gNBs 222 resume transmission of DL-PRS using the old (previous) PRS configuration.

Figure 7A:
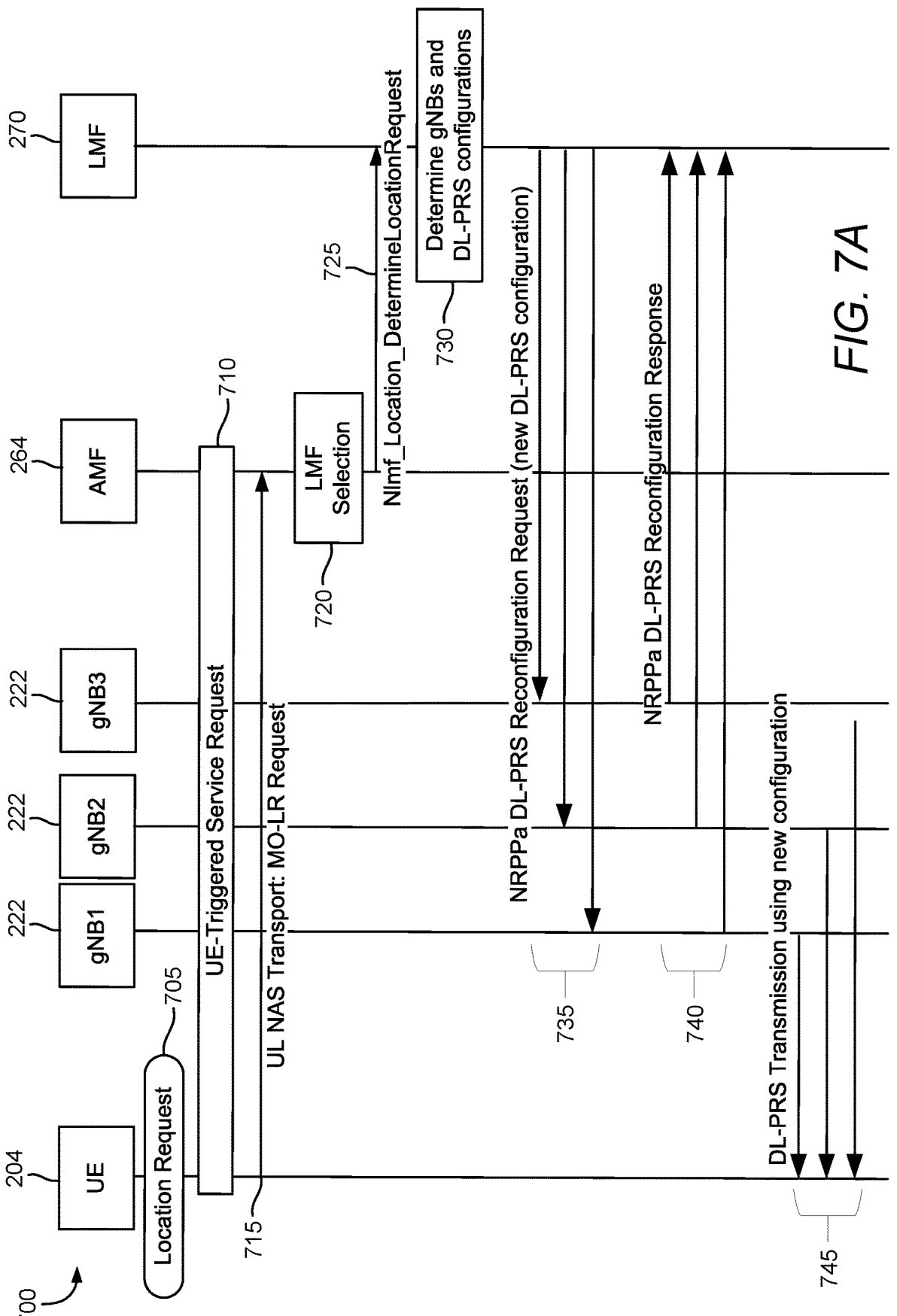
FIGS. 7A and 7B illustrate an example of a UE-initiated on-demand PRS positioning procedure, according to aspects of the disclosure.
Figure 7B:
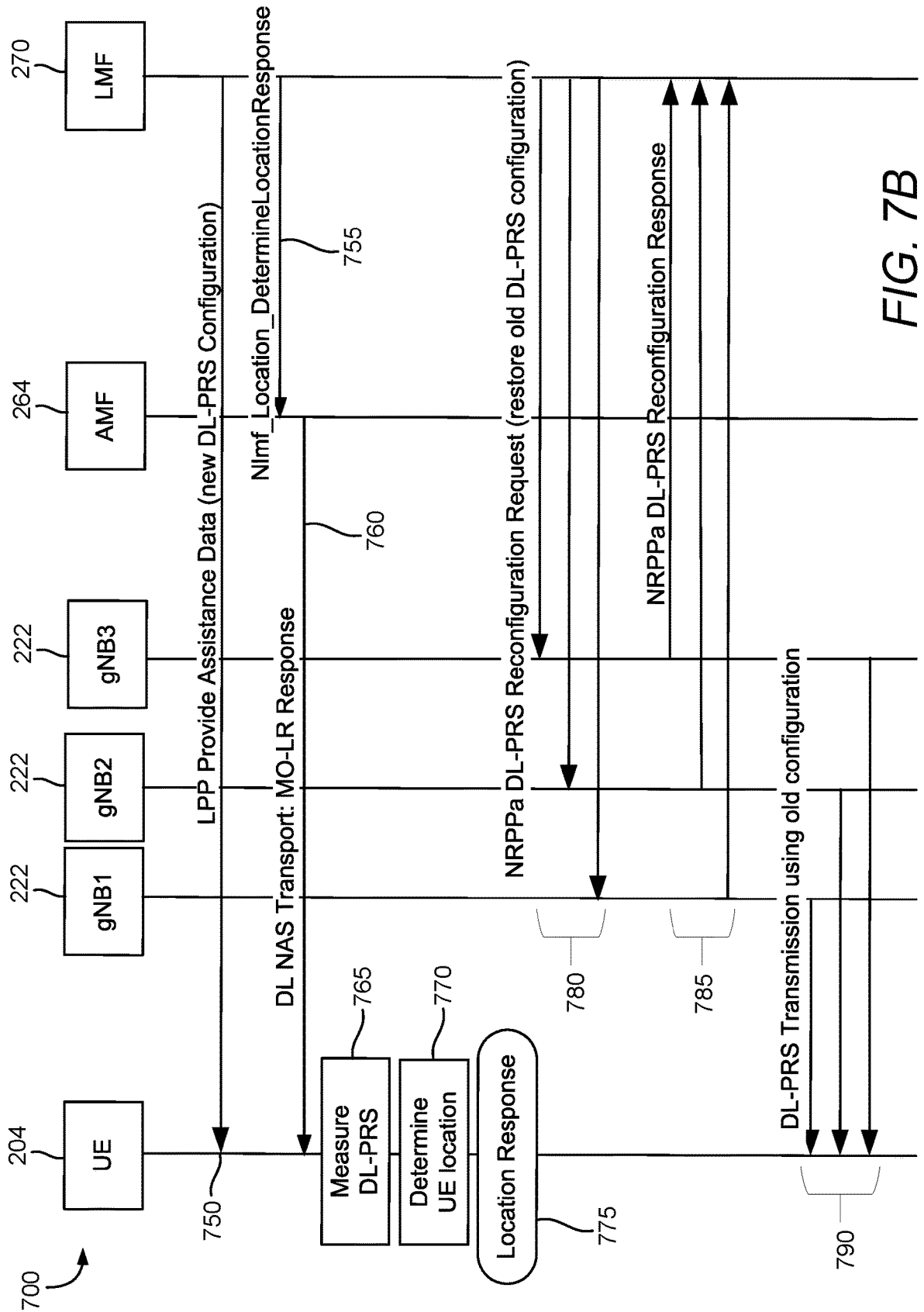

FIGS. 7A and 7B illustrate an example of a UE-initiated on-demand PRS positioning procedure 700, according to aspects of the disclosure. At stage 705, a target UE 204 receives a location request from an internal client (e.g., an application). The UE 204 determines that an increase in DL-PRS transmission is needed (e.g., increased DL-PRS bandwidth, increased duration of positioning occasions, DL-PRS transmission from more nearby gNBs 222, etc.) to meet the QoS requirement from the application. At stage 710, if the UE 204 is in a core management (CM) IDLE state, the UE 204 instigates a UE-triggered Service Request in order to establish a signaling connection with the serving AMF 264.

At stage 715, the UE 204 sends a mobile-originated location request (MO-LR) Request message, including a request for increased DL-PRS transmission, to the serving AMF 264 in an UL NAS TRANSPORT message. The request may include the DL-PRS capabilities of the UE 204 (e.g., in an embedded Provide Capabilities message) and parameters for preferred DL-PRS configurations (which may include a preferred DL-PRS bandwidth, a preferred duration of DL-PRS positioning occasions, preferred DL-PRS beam directions for certain gNBs 222 if known by the UE 204, etc.). The requested DL-PRS configuration parameters may be provided in an LPP Request Assistance Data message included in the MO-LR Request. The MO-LR Request message may also include a time duration for how long the requested DL-PRS configuration is needed by the UE 204 (e.g., number of seconds or minutes for which the DL-PRS configuration is needed).

At stage 720, the AMF 264 selects an LMF 270. At stage 725, the AMF 264 invokes a service operation (e.g., a Nlmf_Location_DetermineLocation service operation) towards the selected LMF 270. The service operation includes the MO-LR Request from stage 715.

At stage 730, based on the request in stage 725, the LMF 270 determines a new DL-PRS configuration (for the requested on-demand PRS) for nearby gNBs 222 (e.g., based on a preferred number of gNBs 222 indicated at stage 715). The determination at stage 730 may also be based on DL-PRS requests received from other UEs 204 as in stage 715 and/or on location procedures for other UEs 204 that occur at about the same time. The new DL-PRS configuration for each gNB 222 may use increased DL-PRS bandwidth, a longer duration of DL-PRS positioning occasions, DL-PRS transmission on new frequencies, and/or a higher frequency of DL-PRS positioning occasions. In some cases, the new DL-PRS configuration may be selected from a set of one or more preconfigured sets of DL-PRS configuration parameters. In the case of beamformed DL-PRS, the LMF 270 may determine directional DL-PRS beams for each gNB 222 that should be received by the UE 204. The directional DL-PRS beams may be selected by the LMF 270 according to a known approximate location for the target UE 204 (e.g., as given by the coverage area of the serving or camped-on cell for the UE 204).

At stage 735, the LMF 270 sends an NRPPa DL-PRS Reconfiguration Request message to each of the gNBs 222 determined at stage 730 and includes in the request the new DL-PRS configuration (for the on-demand PRS) determined for that gNB 222. The request may also include a start time for each new DL-PRS configuration and a duration (e.g., as requested by the UE 204 at stage 715 or determined by the LMF 270 at stage 730).

At stage 740, each of the gNBs 222 returns a response to the LMF 270 indicating whether the new DL-PRS configuration can be supported. If some gNBs 222 indicate that the new DL-PRS configuration cannot be supported, the LMF 270 may perform stages 780 and 785 to restore the old DL-PRS configurations in each of the gNBs 222 that indicated a new DL-PRS configuration can be supported in order to avoid interference between gNBs 222 that support the new DL-PRS configuration and gNBs 222 that do not. In this case, the LMF 270 would provide the old DL-PRS configurations to the UE 204 at stage 750 instead of the new DL-PRS configurations.

At stage 745, each of the gNBs 222 that acknowledged support of a new DL-PRS configuration at stage 740 changes from its old DL-PRS configuration to the new DL-PRS configuration either after (or just before) sending the acknowledgment at stage 740 if no start time was provided or at the start time indicated in stage 735. In some cases, the old DL-PRS configuration may correspond to not transmitting a DL-PRS. Note, in some cases, the start time for switching to the new DL-PRS configuration may result in transmitting the new DL-PRS after stage 750 or stages 755/760. This may typically be the case when the new DL-PRS configuration consists of a single or a few DL-PRS occasions only.

At stage 750, the LMF 270 sends an LPP Provide Assistance Data message to the UE 204. The LPP Provide Assistance Data message includes the new (on-demand) PRS configuration. At stage 755, the LMF 270 sends a location response message (e.g., an "Nlmf_Location_DetermineLocationResponse" message) to the AMF 264. At stage 760, the AMF 264 sends a DL NAS Transport: MO-LR Response message to the UE 204. At stage 765, the UE 204 measures the DL-PRS from the nearby gNBs 222. For example, the UE 204 may measure the ToA, RSRP, RSTD, Rx–Tx time difference, etc. of the DL-PRS from the gNBs 222. At stage 770, the UE 204 determines a location of the UE 204 (for UE-based positioning). At stage 775, the UE 204 provides the location to the internal client requesting the UE's 204 location.

At stage 780, the LMF 270 sends an NRPPa DL-PRS Reconfiguration Request message to the gNBs 222 to instruct them to restore the old (previous non-on-demand) DL-PRS configuration. At stage 785, the gNBs 222 send NRPPa DL-PRS Reconfiguration Response messages to the LMF 270 to indicate successful (or unsuccessful) reconfiguration of the DL-PRS. At stage 790, the gNBs 222 resume transmission of DL-PRS using the old (previous) PRS configuration.

FIG. 8 illustrates various information elements (IEs) that may be used to configure DL-PRS, according to aspects of the disclosure. An "NR-DL-PRS-AssistanceDataPerTRP-r16" IE 810 can be used to provide per-TRP PRS configuration information. For example, the "dl-PRS-ID-r16" field is used along with a "DL-PRS Resource Set ID" and a "DL-PRS Resource ID" to uniquely identify a DL-PRS resource, and is associated with a single TRP. As another example, the "nr-DL-PRS-Info-r16" field specifies the PRS configuration of the TRP.

An "NR-DL-PRS-PositioningFrequencyLayer-r16" IE 820 can be used to configure frequency information for a DL-PRS. For example, the "dl-PRS-ResourceBandwidth-r16" field specifies the number of PRBs allocated for the DL-PRS resource (allocated DL-PRS bandwidth) in multiples of four PRBs. All DL-PRS resources of the DL-PRS resource set have the same bandwidth. All DL-PRS resource sets belonging to the same positioning frequency layer have the same value of DL-PRS bandwidth and start PRB (the start PRB index defined as an offset with respect to a reference DL-PRS Point A for the positioning frequency layer). As another example, the "dl-PRS-PointA-r16" field specifies the absolute frequency of the reference resource block for the DL-PRS. Its lowest subcarrier is also known as DL-PRS Point A. A single DL-PRS Point A for DL-PRS resource allocation is provided per positioning frequency layer. All DL-PRS resources belonging to the same DL-PRS resource set have the same DL-PRS Point A.

An "NR-DL-PRS-SFN0-Offset-r16" IE 830 (referenced by the "nr-DL-PRS-SFN0-Offset-r16" field in the "NR-DL-PRS-AssistanceDataPerTRP-r16" IE 810) can be used to configure the time offset of the SFN #0 slot #0 for the given TRP with respect to SFN #0 slot #0 of the assistance data reference TRP. The "sfn-Offset-r16" field specifies the SFN offset at the TRP antenna location between the assistance data reference TRP and this neighbour TRP. The offset corresponds to the number of full radio frames counted from the beginning of a radio frame #0 of the assistance data reference TRP to the beginning of the closest subsequent radio frame #0 of this neighbour TRP. The "integerSubframeOffset-r16" field specifies the frame boundary offset at the TRP antenna location between the assistance data reference TRP and this neighbour TRP counted in full subframes. The offset is counted from the beginning of a subframe #0 of the assistance data reference TRP to the beginning of the closest subsequent subframe #0 of this neighbour TRP, rounded down to multiples of subframes.

FIG. 9 illustrates an example "NR-DL-PRS-Resource-r16" IE 900, according to aspects of the disclosure. The "NR-DL-PRS-Resource-r16" IE 900 includes various fields to configure a DL-PRS resource for a given TRP. In the example of FIG. 9, the "NR-DL-PRS-Resource-r16" IE 900 includes an "nr-DL-PRS-ResourceID-r16" field identifying the DL-PRS resource, a "dl-PRS-SequenceID-r16" field identifying the sequence of the DL-PRS resource, a "dl-PRS-CombSizeN-AndReOffset-r16" field indicating the comb size and resource element (RE) offset of the DL-PRS resource, a "dl-PRS-ResourceSlotOffset-r16" field indicating the slot offset of the DL-PRS resource, a "dl-PRS-ResourceSymbolOffset-r16" field indicating the symbol offset of the DL-PRS resource, and a "dl-PRS-QCL-Info-r16" field indicating the QCL source for the DL-PRS resource.

Figure 10:
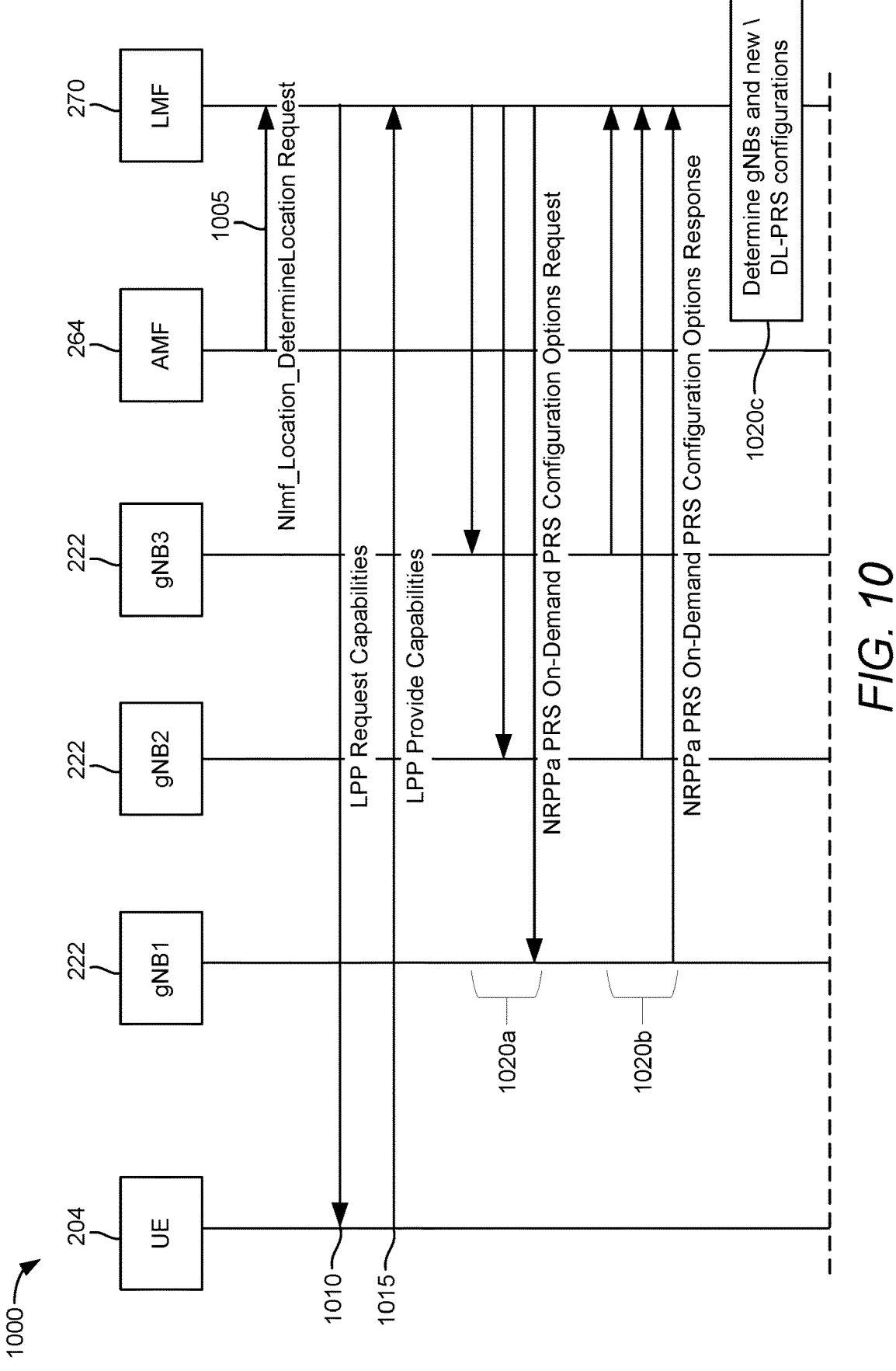
FIG. 10 illustrates a portion of an example of a location server-initiated on-demand PRS positioning procedure, according to aspects of the disclosure.

The present disclosure provides signaling techniques for requesting, from a transmitting device, a preferred configuration or set of parameters for on-demand PRS. FIG. 10 illustrates a portion of an example of a location server-initiated on-demand PRS positioning procedure 1000, according to aspects of the disclosure. At stage 1005, like stage 605 of FIG. 6A, the serving AMF 264 for a target UE 204 invokes a service operation (e.g., a "Nlmf_Location-_DetermineLocation" service operation) towards the UE's 204 LMF 270 to request the current location of the UE 204. The service operation includes the UE's 204 serving cell identity, the LCS client type (e.g., an emergency services client type or a commercial client type), and may include a required QoS.

At stage 1010, like stage 610 of FIG. 6A, the LMF 270 sends an LPP Request Capabilities message to the target UE 204 to request the positioning capabilities of the UE 204. At stage 1015, like stage 615 of FIG. 6A, the UE 204 returns an LPP Provide Capabilities message to the LMF 270 to provide the positioning capabilities of the UE 204. The positioning capabilities include the DL-PRS measurement capabilities of the UE 204.

Stages 1020a, 1020b, and 1020c replace stage 620 in the location server-initiated on-demand PRS positioning procedure 600 of FIG. 6A. At stage 1020a, the LMF 270 sends a request to one or more gNBs 222 for a set of supportable PRS configurations or PRS parameters from which the LMF 270 can request on-demand PRS. The request may include one or more timestamps and/or durations during which the on-demand PRS would be transmitted for a positioning session with the UE 204. The gNBs 222 may be selected based on being within some threshold distance of the location of the UE 204, as determined by the serving cell identity received at stage 1005.

At stage 1020b, each gNB 222 responds with a list of PRS configurations and/or PRS parameters that it can support. That is, the list of PRS configurations and/or PRS parameters indicate PRS configurations and/or PRS parameters that the gNB 222 could apply to or use for the transmission of DL-PRS. For example, a gNB 222 may provide a list of "NR-DL-PRS-Resource-r16" IEs 900, one for each PRS resource configuration the gNB 222 can support. Each "NR-DL-PRS-Resource-r16" IE 900 may itself be a list of the parameter values for that "NR-DL-PRS-Resource-r16" IE 900. Thus, a PRS configuration provided at stage 1020b may also be referred to as a set of PRS parameters. Alternatively, a gNB 222 may provide a list of values it can support for each of the parameters of the "NR-DL-PRS- Resource-r16" IE 900. That is, the gNB 222 may provide a list of supported values for the parameters "nr-DL-PRS-ResourceID-r16," "dl-PRS-SequenceID-r16," "dl-PRS-CombSizeN-AndReOffset-r16," etc.

Each of the different PRS configurations and/or PRS parameter values may be associated with an index value. In that way, a particular PRS configuration or PRS parameter value may be referred to by its associated index value, rather than having to transmit the entire PRS configuration or parameter value. The responses may also contain time-stamps and/or durations associated with one or more elements of the lists (i.e., PRS configurations or parameters) indicating the time at which or the duration during which a particular PRS configuration and/or PRS parameter would be valid/could be supported.

In an aspect, a gNB 222 may include prioritization indicators in the list of supported PRS configurations and/or parameters. For example, each PRS configuration or parameter may have an associated priority, or only certain PRS configurations or parameters may have an associated priority. The prioritization indicator may indicate the priority of the associated PRS configuration or parameter compared to other PRS configurations or parameters.

At stage 1020*c*, based on the LCS client type, the QoS (if provided at stage 1005), the DL-PRS measurement capabilities of the UE 204 (received at stage 1015), and the lists of PRS configurations and/or PRS parameters that the gNBs 222 can support (received at stage 1020*b*), the LMF 270 determines a set of gNBs 222 to be measured by the UE 204 and the DL-PRS configuration (for the requested on-demand PRS) for the involved gNBs 222. Like the determination at stage 620 of FIG. 6A, the determination at stage 1020*c* may also be based on location requests for other UEs 204 nearby to the target UE 204, which are received by the LMF 270 at about the same time. The new DL-PRS configuration for each gNB 222 may use increased DL-PRS bandwidth, a longer duration of DL-PRS positioning occasions, DL-PRS transmission on new frequencies, a higher frequency of DL-PRS positioning occasions, and/or the like, as supported by the gNBs 222 based on the lists received at stage 1020*b*. The DL-PRS configuration may be selected from one of the gNB-chosen PRS configurations received at stage 1020*b*, or determined from the PRS parameters received at stage 1020*b*. In addition, where the lists received at stage 1020*b* included timestamps or durations, the selection or determination of the PRS configuration may be further based on the received timestamps or duration.

The remainder of the location server-initiated on-demand PRS positioning procedure 1000 is the same as the location server-initiated on-demand PRS positioning procedure 600 in FIGS. 6A and 6B, and is therefore not described here for the sake of brevity.

Figure 11:
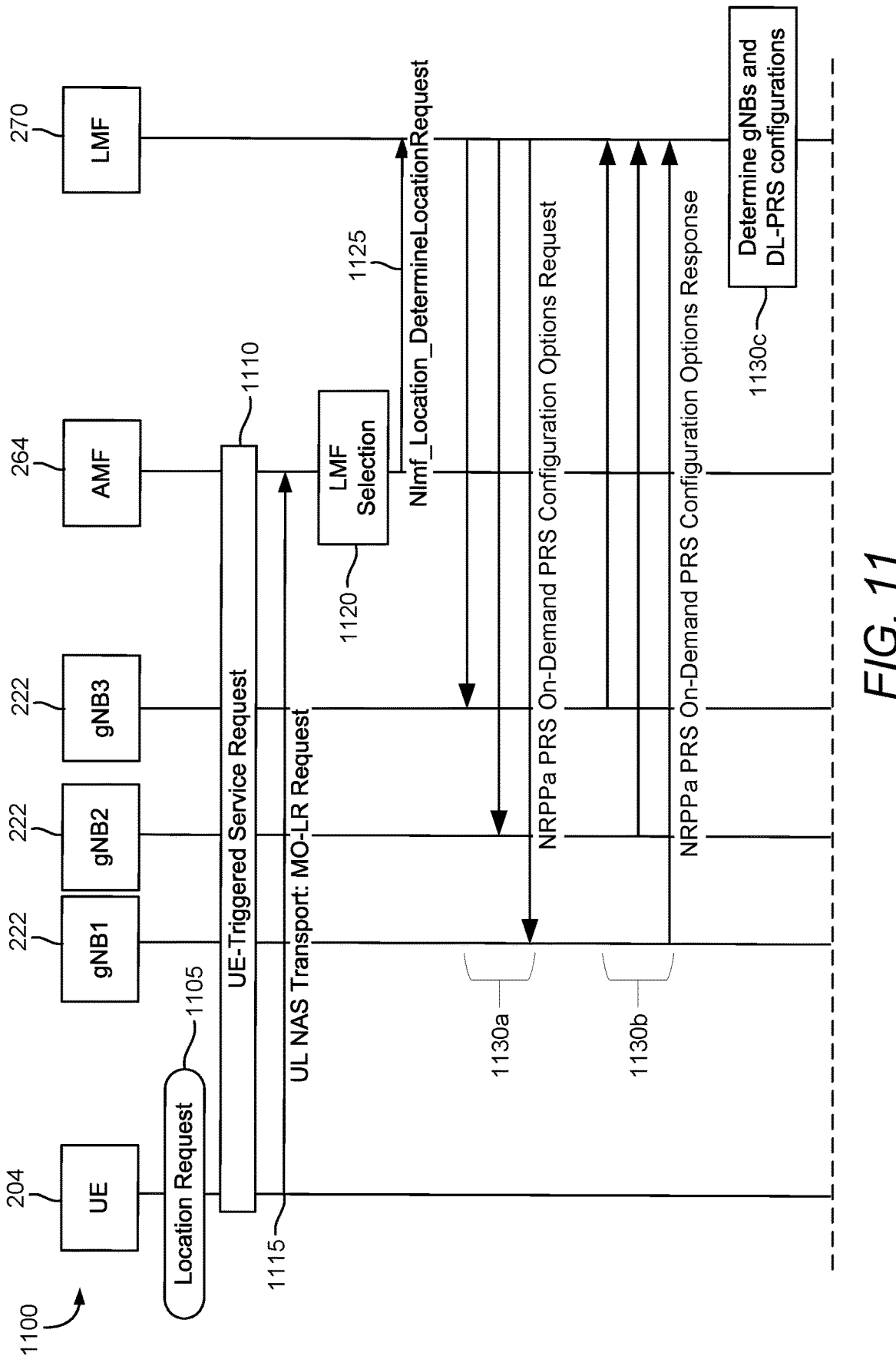
FIG. 11 illustrates an example of a UE-initiated on-demand PRS positioning procedure, according to aspects of the disclosure.

FIG. 11 illustrates an example of a UE-initiated on-demand PRS positioning procedure 1100, according to aspects of the disclosure. At stage 1105, like stage 705 of FIG. 7A, a target UE 204 receives a location request from an internal client (e.g., an application). The UE 204 determines that an increase in DL-PRS transmission is needed (e.g., increased DL-PRS bandwidth, increased duration of positioning occasions, DL-PRS transmission from more nearby gNBs 222, etc.) to meet the QoS requirement from the application. At stage 1110, like stage 710 in FIG. 7A, if the UE 204 is in a CM IDLE state, the UE 204 instigates a UE-triggered Service Request in order to establish a signaling connection with the serving AMF 264.

At stage 1115, like stage 715 in FIG. 7A, the UE 204 sends an MO-LR Request message, including a request for increased DL-PRS transmission, to the serving AMF 264 in an UL NAS TRANSPORT message. The request may include the DL-PRS capabilities of the UE 204 (e.g., in an embedded Provide Capabilities message) and parameters for preferred DL-PRS configurations (which may include a preferred DL-PRS bandwidth, a preferred duration of DL-PRS positioning occasions, preferred DL-PRS beam directions for certain gNBs 222 if known by the UE 204, etc.). The requested DL-PRS configuration parameters may be provided in an LPP Request Assistance Data message included in the MO-LR Request. The MO-LR Request message may also include a time duration for how long the requested DL-PRS configuration is needed by the UE 204 (e.g., number of seconds or minutes for which the DL-PRS configuration is needed).

At stage 1120, like stage 720 of FIG. 7A, the AMF 264 selects an LMF 270. At stage 1125, like stage 725 of FIG. 7A, the AMF 264 invokes a service operation (e.g., a Nlmf_Location_DetermineLocation service operation) towards the selected LMF 270, as at stage 725 of FIG. 7A. The service operation includes the MO-LR Request from stage 1115.

Stages 1130*a* to 1130*c* replace stage 730 of FIG. 7A. At stage 1130*a*, the LMF 270 sends a request to one or more gNBs 222 for a set of supportable PRS configurations or PRS parameters from which the LMF 270 can request on-demand PRS, as at stage 1020*a* of FIG. 10. The request may include one or more timestamps and/or durations during which the on-demand PRS would be transmitted for a positioning session with the UE 204. The gNBs 222 may be selected based on being within some threshold distance of the location of the UE 204, as determined by the serving cell identity of the UE 204.

At stage 1130*b*, each gNB 222 responds with a list of PRS configurations and/or PRS parameters that it can support, as at stage 1020*b* of FIG. 10. That is, the list of PRS configurations and/or PRS parameters indicate PRS configurations and/or PRS parameters that the gNB 222 could apply to or use for the transmission of DL-PRS. As described above, each of the different PRS configurations and/or PRS parameters may be associated with an index value, a priority indicator, a timestamp, and/or a duration.

At stage 1130*c*, based on the request received in stage 1125 and the lists received in stage 1130*b*, the LMF 270 determines a set of gNBs 222 to be measured by the UE 204 and the DL-PRS configuration (for the requested on-demand PRS) for the involved gNBs 222. Like the determination at stage 730 of FIG. 7A, the determination at stage 1130*c* may also be based on location requests for other UEs 204 nearby to the target UE 204, which are received by the LMF 270 at about the same time. The new DL-PRS configuration for each gNB 222 may use increased DL-PRS bandwidth, a longer duration of DL-PRS positioning occasions, DL-PRS transmission on new frequencies, a higher frequency of DL-PRS positioning occasions, and/or the like, as supported by the gNBs 222 based on the lists received at stage 1130*b*. The DL-PRS configuration may be selected from one of the gNB-chosen PRS configurations received at stage 1130*b*, or determined from the PRS parameters received at stage 1130*b*. In addition, where the lists received at stage 1130*b* included timestamps or durations, the selection or determination of the PRS configuration may be further based on the received timestamps or duration.

The remainder of the UE-initiated on-demand PRS positioning procedure 1100 is the same as the UE-initiated on-demand PRS positioning procedure 700 in FIGS. 7A and 7B, and is therefore not described here for the sake of brevity.

In an aspect, a gNB 222 may send, at stages 1020*b* and 1130*b*, a list of potential scrambling identifiers (IDs) that it can support. For example, a gNB 222 may respond that it plans to use "PCI+0," "PCI+1," "PCI+63" as the potential scrambling IDs, or the set {0, 1, . . . , 63}. The LMF 270 may eventually suggest a different scrambling ID for the PRS transmitted from a gNB 222 (at stages 1020*c* and 1130*c*) to ensure time and/or frequency orthogonality with the PRS transmitted by other gNBs 222. That is, scrambling allows for the simultaneous transmission of DL-PRS without the need for time-division multiplexing (TDM).

The present techniques are also applicable to sidelink positioning. In sidelink positioning, UEs (referred to as sidelink UEs) transmit sidelink PRS (SL-PRS) to each other on uplink time and frequency resources to determine the distance, or range, between themselves. For sidelink positioning in the context of the techniques described above with reference to FIGS. 10 and 11, one or more of the gNBs 222 in FIGS. 10 and 11 would instead be other UEs 204. In these cases, the LMF 270 would request, at stages 1020*a* and 1130*a*, a set of SL-PRS that a UE 204 is capable of transmitting, a list of SL-PRS configurations the UE 204 can support, and/or SL-PRS parameters the UE 204 can support. These configurations and/or parameters may be similar to the DL-PRS configurations and parameters illustrated and described with reference to FIGS. 8 and 9. Rather than transmitting the request to a gNB 222 via NRPPa signaling, as shown for stages 1020*b* and 1130*b*, the LMF 270 would instead send the request directly to the UE(s) 204 via LPP signaling.

At stages 1020*b* and 1130*b*, the UE(s) 204 would respond with a list of potential SL-PRS it can transmit or a list of SL-PRS configurations and/or SL-PRS parameters it can use to transmit SL-PRS. Note that this is different from the UE(s) 204 reporting their capabilities (e.g., as the target UE 204 does at stages 1015 and 1115). Specifically, in capability reporting, a UE 204 indicates what it is capable of transmitting and/or measuring. In the response(s) at stages 1020*b* and 1130*b*, the UE(s) 204 indicate one or more preferred PRS configurations and/or one or more preferred PRS parameters.

As with the DL-PRS configurations and parameters from the gNBs 222, each of the SL-PRS configurations and/or parameters may be associated with an index value. In addition, the responses may also contain timestamps and/or durations associated with one or more elements of the lists (i.e., SL-PRS configurations or parameters) indicating the time at which or the duration during which a particular SL-PRS configuration and/or SL-PRS parameter can be supported. Also like the DL-PRS configurations and parameters from the gNBs 222, a UE 204 may include prioritization indicators in the list of supported SL-PRS configurations and/or parameters.

FIG. 12 illustrates an example method 1200 of positioning, according to aspects of the disclosure. In an aspect, method 1200 may be performed by a network node (e.g., any of the UEs or base stations described herein).

At 1210, the network node receives, from a location server (e.g., LMF 270), a first request requesting on-demand PRS configurations supported by the network node, as at stages 1020*a* and 1130*a*. In an aspect, where the network node is a base station, operation 1210 may be performed by WWAN transceiver 350, network transceiver 380, processor 384, memory 386, and/or positioning component 388, any or all of which may be considered means for performing this operation. Where the network node is a UE, operation 1210 may be performed by WWAN transceiver 310, processor 332, memory 340, and/or positioning component 342, any or all of which may be considered means for performing this operation.

At 1220, the network node transmits a response to the location server, as at stages 1020*b* and 1130*b*. The response identifies one or more alternate PRS configurations, one or more alternate PRS parameters, or both defining one or more on-demand PRS resources the network node would prefer to transmit during a positioning session (e.g., RTT, DL-TDOA, E-CID, DL-AoD, etc.) between the location server and one or more target UEs (e.g., one or more UEs 204). In an aspect, where the network node is a base station, operation 1220 may be performed by WWAN transceiver 350, network transceiver 380, processor 384, memory 386, and/or positioning component 388, any or all of which may be considered means for performing this operation. Where the network node is a UE, operation 1220 may be performed by WWAN transceiver 310, processor 332, memory 340, and/or positioning component 342, any or all of which may be considered means for performing this operation.

At 1230, the network node receives, from the location server, a second request requesting on-demand PRS transmission, as at stages 625 and 735. The second request identifies at least one of the one or more alternate PRS configurations, at least one of the one or more alternate PRS parameters, or both. In an aspect, where the network node is a base station, operation 1230 may be performed by WWAN transceiver 350, network transceiver 380, processor 384, memory 386, and/or positioning component 388, any or all of which may be considered means for performing this operation. Where the network node is a UE, operation 1230 may be performed by WWAN transceiver 310, processor 332, memory 340, and/or positioning component 342, any or all of which may be considered means for performing this operation.

At 1240, the network node transmits at least one of the one or more on-demand PRS resources according to the at least one of the one or more alternate PRS configurations, the at least one of the one or more alternate PRS parameters, or both, as at stages 635 and 745. In an aspect, where the network node is a base station, operation 1240 may be performed by WWAN transceiver 350, network transceiver 380, processor 384, memory 386, and/or positioning component 388, any or all of which may be considered means for performing this operation. Where the network node is a UE, operation 1240 may be performed by WWAN transceiver 310, processor 332, memory 340, and/or positioning component 342, any or all of which may be considered means for performing this operation.

FIG. 13 illustrates an example method 1300 of positioning, according to aspects of the disclosure. In an aspect, method 1300 may be performed by a location server (e.g., LMF 270).

At 1310, the location server transmits, to a network node (e.g., UE 204, gNB 222), a first request requesting on-demand PRS configurations supported by the network node, as at stages 1020*a* and 1130*a*. In an aspect, operation 1310 may be performed by network transceiver 390, processor 394, memory 396, and/or positioning component 398, any or all of which may be considered means for performing this operation.

At 1320, the location server receives a response from the network node, as at stages 1020*b* and 1130*b*. The response identifies one or more alternate PRS configurations, one or more alternate PRS parameters, or both defining one or more on-demand PRS resources the network node would prefer to transmit during a positioning session (e.g., RTT, DL-TDOA, E-CID, DL-AoD, etc.) between the location server and one or more target UEs (e.g., one or more UEs 204). In an aspect, operation 1320 may be performed by network transceiver 390, processor 394, memory 396, and/or positioning component 398, any or all of which may be considered means for performing this operation.

At 1330, the location server transmits, to the network node, a second request requesting on-demand PRS transmission, as at stages 625 and 635. The second request identifies at least one of the one or more alternate PRS configurations, at least one of the one or more alternate PRS parameters, or both. In an aspect, operation 1330 may be performed by network transceiver 390, processor 394, memory 396, and/or positioning component 398, any or all of which may be considered means for performing this operation.

As will be appreciated, a technical advantage of the methods 1200 and 1300 is that they allow the network node to specify the on-demand PRS resource configuration it would prefer to use for a positioning session.

In the detailed description above it can be seen that different features are grouped together in examples. This manner of disclosure should not be understood as an intention that the example clauses have more features than are explicitly mentioned in each clause. Rather, the various aspects of the disclosure may include fewer than all features of an individual example clause disclosed. Therefore, the following clauses should hereby be deemed to be incorporated in the description, wherein each clause by itself can stand as a separate example. Although each dependent clause can refer in the clauses to a specific combination with one of the other clauses, the aspect(s) of that dependent clause are not limited to the specific combination. It will be appreciated that other example clauses can also include a combination of the dependent clause aspect(s) with the subject matter of any other dependent clause or independent clause or a combination of any feature with other dependent and independent clauses. The various aspects disclosed herein expressly include these combinations, unless it is explicitly expressed or can be readily inferred that a specific combination is not intended (e.g., contradictory aspects, such as defining an element as both an insulator and a conductor). Furthermore, it is also intended that aspects of a clause can be included in any other independent clause, even if the clause is not directly dependent on the independent clause.

Implementation examples are described in the following numbered clauses:

Clause 1. A method of positioning performed by a network node, comprising: receiving, from a location server, a first request requesting on-demand positioning reference signal (PRS) configurations supported by the network node; transmitting a response to the location server, the response identifying one or more alternate PRS configurations, one or more alternate PRS parameters, or both defining one or more on-demand PRS resources the network node would prefer to transmit during a positioning session between the location server and one or more target UEs; receiving, from the location server, a second request requesting on-demand PRS transmission, the second request identifying at least one of the one or more alternate PRS configurations, at least one of the one or more alternate PRS parameters, or both; and transmitting at least one of the one or more on-demand PRS resources according to the at least one of the one or more alternate PRS configurations, the at least one of the one or more alternate PRS parameters, or both.

Clause 2. The method of clause 1, wherein, for each of the one or more on-demand PRS resources, the one or more alternate PRS parameters comprise: a PRS resource identifier, a sequence identifier, a comb size and resource element offset, a slot offset, a symbol offset, a quasi-co-location (QCL) source identifier, or any combination thereof.

Clause 3. The method of any of clauses 1 to 2, wherein each of the one or more alternate PRS configurations comprises: a PRS resource identifier, a sequence identifier, a comb size and resource element offset, a slot offset, a symbol offset, a quasi-co-location (QCL) source identifier, or any combination thereof.

Clause 4. The method of any of clauses 1 to 3, wherein the response further includes a priority indicator associated with each of the one or more alternate PRS configurations, the one or more alternate PRS parameters, or both.

Clause 5. The method of clause 4, wherein the first request includes an indication that the location server expects the response to include the priority indicator associated with each of the one or more alternate PRS configurations, the one or more alternate PRS parameters, or both.

Clause 6. The method of any of clauses 1 to 5, wherein the response further includes a timestamp or time duration associated with each PRS configuration or PRS parameter of the one or more alternate PRS configurations, the one or more alternate PRS parameters, or both, the timestamp or duration indicating a time period during which the PRS configuration or the PRS parameter is valid.

Clause 7. The method of clause 6, wherein the first request includes an indication that the location server expects the response to include the timestamp or time duration associated with each PRS configuration or PRS parameter of the one or more alternate PRS configurations, the one or more alternate PRS parameters, or both.

Clause 8. The method of any of clauses 1 to 7, wherein the response further includes a list of PRS scrambling identifiers that the network node can support.

Clause 9. The method of clause 8, wherein the first request includes an indication that the location server expects the response to include the list of PRS scrambling identifiers that the network node can support.

Clause 10. The method of any of clauses 1 to 9, wherein the response further includes an index value for each of the one or more alternate PRS configurations, the one or more alternate PRS parameters, or both.

Clause 11. The method of any of clauses 1 to 10, wherein the first request includes one or more timestamps or durations during which the network node would be expected to transmit the one or more on-demand PRS resources to the one or more target UEs.

Clause 12. The method of any of clauses 1 to 11, wherein the first request includes one or more quality of service indications that the network node is expected to consider when determining the one or more on-demand PRS resources.

Clause 13. The method of any of clauses 1 to 12, wherein the second request identifies the at least one of the one or more alternate PRS configurations or the at least one of the one or more alternate PRS parameters with an index value associated with the at least one of the one or more PRS configurations or the at least one of the one or more alternate PRS parameters.

Clause 14. The method of any of clauses 1 to 13, further comprising: transmitting, to the location server, an acknowledgment indicating that the network node will transmit the at least one of the one or more on-demand PRS resources according to the at least one of the one or more alternate PRS configurations, the at least one of the one or more alternate PRS parameters, or both.

Clause 15. The method of any of clauses 1 to 14, wherein: the network node is a base station, the one or more on-demand PRS resources are one or more on-demand downlink PRS resources, the first request is a first New Radio positioning protocol type A (NRPPa) message, the response is a second NRPPa message, and the second request is a third NRPPa message.

Clause 16. The method of any of clauses 1 to 14, wherein: the network node is a UE, the one or more on-demand PRS resources are one or more on-demand sidelink PRS resources, the first request is a first Long-Term Evolution positioning protocol (LPP) message, the response is a second LPP message, and the second request is a third LPP message.

Clause 17. A method of positioning performed by a location server, comprising: transmitting, to a network node, a first request requesting on-demand positioning reference signal (PRS) configurations supported by the network node; receiving a response from the network node, the response identifying one or more alternate PRS configurations, one or more alternate PRS parameters, or both defining one or more on-demand PRS resources the network node would prefer to transmit during a positioning session between the location server and one or more target UEs; and transmitting, to the network node, a second request requesting on-demand PRS transmission, the second request identifying at least one of the one or more alternate PRS configurations, at least one of the one or more alternate PRS parameters, or both.

Clause 18. The method of clause 17, wherein, for each of the one or more on-demand PRS resources, the one or more alternate PRS parameters comprise: a PRS resource identifier, a sequence identifier, a comb size and resource element offset, a slot offset, a symbol offset, a quasi-co-location (QCL) source identifier, or any combination thereof.

Clause 19. The method of any of clauses 17 to 18, wherein each of the one or more alternate PRS configurations comprises: a PRS resource identifier, a sequence identifier, a comb size and resource element offset, a slot offset, a symbol offset, a quasi-co-location (QCL) source identifier, or any combination thereof.

Clause 20. The method of any of clauses 17 to 19, wherein the response further includes a priority indicator associated with each of the one or more alternate PRS configurations, the one or more alternate PRS parameters, or both.

Clause 21. The method of clause 20, wherein the first request includes an indication that the location server expects the response to include the priority indicator associated with each of the one or more alternate PRS configurations, the one or more alternate PRS parameters, or both.

Clause 22. The method of any of clauses 17 to 21, wherein the response further includes a timestamp or time duration associated with each PRS configuration or PRS parameter of the one or more alternate PRS configurations, the one or more alternate PRS parameters, or both, the timestamp or duration indicating a time period during which the PRS configuration or the PRS parameter is valid.

Clause 23. The method of clause 22, wherein the first request includes an indication that the location server expects the response to include the timestamp or time duration associated with each PRS configuration or PRS parameter of the one or more alternate PRS configurations, the one or more alternate PRS parameters, or both.

Clause 24. The method of any of clauses 17 to 23, wherein the response further includes a list of PRS scrambling identifiers that the network node can support.

Clause 25. The method of clause 24, wherein the first request includes an indication that the location server expects the response to include the list of PRS scrambling identifiers that the network node can support.

Clause 26. The method of any of clauses 17 to 25, wherein the response further includes an index value for each of the one or more alternate PRS configurations, the one or more alternate PRS parameters, or both.

Clause 27. The method of any of clauses 17 to 26, wherein the first request includes one or more timestamps or durations during which the network node would be expected to transmit the one or more on-demand PRS resources to the one or more target UEs.

Clause 28. The method of any of clauses 17 to 27, wherein the first request includes one or more quality of service indications that the network node is expected to consider when determining the one or more on-demand PRS resources.

Clause 29. The method of any of clauses 17 to 28, wherein the second request identifies the at least one of the one or more alternate PRS configurations or the at least one of the one or more alternate PRS parameters with an index value associated with the at least one of the one or more alternate PRS configurations or the at least one of the one or more alternate PRS parameters.

Clause 30. The method of any of clauses 17 to 29, further comprising: receiving, from the network node, an acknowledgment indicating that the network node will transmit at least one on-demand PRS resource according to the at least one of the one or more alternate PRS configurations, the at least one of the one or more alternate PRS parameters, or both.

Clause 31. The method of any of clauses 17 to 30, wherein: the network node is a base station, the one or more on-demand PRS resources are one or more on-demand downlink PRS resources, the request is a first New Radio positioning protocol type A (NRPPa) message, the response is a second NRPPa message, and the second request is a third NRPPa message.

Clause 32. The method of any of clauses 17 to 30, wherein: the network node is a UE, the one or more on-demand PRS resources are one or more on-demand sidelink PRS resources, the request is a first Long-Term Evolution positioning protocol (LPP) message, the response is a second LPP message, and the second request is a third LPP message.

Clause 33. An apparatus comprising a memory, at least one transceiver, and at least one processor communicatively coupled to the memory and the at least one transceiver, the memory, the at least one transceiver, and the at least one processor configured to perform a method according to any of clauses 1 to 32.

Clause 34. An apparatus comprising means for performing a method according to any of clauses 1 to 32.

Clause 35. A non-transitory computer-readable medium storing computer-executable instructions, the computer-executable comprising at least one instruction for causing a computer or processor to perform a method according to any of clauses 1 to 32.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented or performed with a general purpose processor, a digital signal processor (DSP), an ASIC, a field-programmable gate array (FPGA), or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, for example, a combination of a DSP and a microprocessor, a plurality of microprocessors, one or more microprocessors in conjunction with a DSP core, or any other such configuration.

The methods, sequences and/or algorithms described in connection with the aspects disclosed herein may be embodied directly in hardware, in a software module executed by a processor, or in a combination of the two. A software module may reside in random access memory (RAM), flash memory, read-only memory (ROM), erasable programmable ROM (EPROM), electrically erasable programmable ROM (EEPROM), registers, hard disk, a removable disk, a CD-ROM, or any other form of storage medium known in the art. An example storage medium is coupled to the processor such that the processor can read information from, and write information to, the storage medium. In the alternative, the storage medium may be integral to the processor. The processor and the storage medium may reside in an ASIC. The ASIC may reside in a user terminal (e.g., UE). In the alternative, the processor and the storage medium may reside as discrete components in a user terminal.

In one or more example aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

While the foregoing disclosure shows illustrative aspects of the disclosure, it should be noted that various changes and modifications could be made herein without departing from the scope of the disclosure as defined by the appended claims. The functions, steps and/or actions of the method claims in accordance with the aspects of the disclosure described herein need not be performed in any particular order. Furthermore, although elements of the disclosure may be described or claimed in the singular, the plural is contemplated unless limitation to the singular is explicitly stated.

What is claimed is:

1. A method of positioning performed by a network node, comprising:

receiving, from a location server, a first request requesting on-demand positioning reference signal (PRS) configurations supported by the network node;

transmitting a response to the location server, the response identifying one or more alternate PRS configurations, one or more alternate PRS parameters, or both defining one or more on-demand PRS resources the network node would prefer to transmit during a positioning session between the location server and one or more target UEs;

receiving, from the location server, a second request requesting on-demand PRS transmission, the second request identifying at least one of the one or more alternate PRS configurations, at least one of the one or more alternate PRS parameters, or both; and transmitting at least one of the one or more on-demand PRS resources according to the at least one of the one or more alternate PRS configurations, the at least one of the one or more alternate PRS parameters, or both.

2. The method of claim 1, wherein, for each of the one or more on-demand PRS resources, the one or more alternate PRS parameters comprise:

a PRS resource identifier, a sequence identifier, a comb size and resource element offset, a slot offset, a symbol offset, a quasi-co-location (QCL) source identifier, or any combination thereof.

3. The method of claim 1, wherein each of the one or more alternate PRS configurations comprises:

a PRS resource identifier, a sequence identifier, a comb size and resource element offset, a slot offset, a symbol offset, a quasi-co-location (QCL) source identifier, or any combination thereof.

4. The method of claim 1, wherein the response further includes a priority indicator associated with each of the one or more alternate PRS configurations, the one or more alternate PRS parameters, or both.

5. The method of claim 4, wherein the first request includes an indication that the location server expects the response to include the priority indicator associated with each of the one or more alternate PRS configurations, the one or more alternate PRS parameters, or both.

6. The method of claim 1, wherein the response further includes a timestamp or time duration associated with each PRS configuration or PRS parameter of the one or more alternate PRS configurations, the one or more alternate PRS parameters, or both, the timestamp or duration indicating a time period during which the PRS configuration or the PRS parameter is valid.

7. The method of claim 6, wherein the first request includes an indication that the location server expects the response to include the timestamp or time duration associated with each PRS configuration or PRS parameter of the one or more alternate PRS configurations, the one or more alternate PRS parameters, or both.

8. The method of claim 1, wherein the response further includes a list of PRS scrambling identifiers that the network node can support.

9. The method of claim 8, wherein the first request includes an indication that the location server expects the response to include the list of PRS scrambling identifiers that the network node can support.

10. The method of claim 1, wherein the response further includes an index value for each of the one or more alternate PRS configurations, the one or more alternate PRS parameters, or both.

11. The method of claim 1, wherein the first request includes one or more timestamps or durations during which the network node would be expected to transmit the one or more on-demand PRS resources to the one or more target UEs.

12. The method of claim 1, wherein the first request includes one or more quality of service indications that the network node is expected to consider when determining the one or more on-demand PRS resources.

13. The method of claim 1, wherein the second request identifies the at least one of the one or more alternate PRS configurations or the at least one of the one or more alternate PRS parameters with an index value associated with the at least one of the one or more PRS configurations or the at least one of the one or more alternate PRS parameters.

14. The method of claim 1, further comprising:

transmitting, to the location server, an acknowledgment indicating that the network node will transmit the at least one of the one or more on-demand PRS resources according to the at least one of the one or more alternate PRS configurations, the at least one of the one or more alternate PRS parameters, or both.

15. The method of claim 1, wherein:

the network node is a base station, the one or more on-demand PRS resources are one or more on-demand downlink PRS resources, the first request is a first New Radio positioning protocol type A (NRPPa) message, the response is a second NRPPa message, and the second request is a third NRPPa message.

16. The method of claim 1, wherein:

the network node is a UE, the one or more on-demand PRS resources are one or more on-demand sidelink PRS resources, the first request is a first Long-Term Evolution positioning protocol (LPP) message, the response is a second LPP message, and the second request is a third LPP message.

17. A method of positioning performed by a location server, comprising:

transmitting, to a network node, a first request requesting on-demand positioning reference signal (PRS) configurations supported by the network node;

receiving a response from the network node, the response identifying one or more alternate PRS configurations, one or more alternate PRS parameters, or both defining one or more on-demand PRS resources the network node would prefer to transmit during a positioning session between the location server and one or more target UEs; and transmitting, to the network node, a second request requesting on-demand PRS transmission, the second request identifying at least one of the one or more alternate PRS configurations, at least one of the one or more alternate PRS parameters, or both.

18. The method of claim 17, wherein, for each of the one or more on-demand PRS resources, the one or more alternate PRS parameters comprise:

a PRS resource identifier, a sequence identifier, a comb size and resource element offset, a slot offset, a symbol offset, a quasi-co-location (QCL) source identifier, or any combination thereof.

19. The method of claim 17, wherein each of the one or more alternate PRS configurations comprises:

a PRS resource identifier, a sequence identifier, a comb size and resource element offset, a slot offset, a symbol offset, a quasi-co-location (QCL) source identifier, or any combination thereof.

20. The method of claim 17, wherein the response further includes a priority indicator associated with each of the one or more alternate PRS configurations, the one or more alternate PRS parameters, or both.

21. The method of claim 20, wherein the first request includes an indication that the location server expects the response to include the priority indicator associated with each of the one or more alternate PRS configurations, the one or more alternate PRS parameters, or both.

22. The method of claim 17, wherein the response further includes a timestamp or time duration associated with each PRS configuration or PRS parameter of the one or more alternate PRS configurations, the one or more alternate PRS parameters, or both, the timestamp or duration indicating a time period during which the PRS configuration or the PRS parameter is valid.

23. The method of claim 22, wherein the first request includes an indication that the location server expects the response to include the timestamp or time duration associated with each PRS configuration or PRS parameter of the one or more alternate PRS configurations, the one or more alternate PRS parameters, or both.

24. The method of claim 17, wherein the response further includes a list of PRS scrambling identifiers that the network node can support.

25. The method of claim 24, wherein the first request includes an indication that the location server expects the response to include the list of PRS scrambling identifiers that the network node can support.

26. The method of claim 17, wherein the response further includes an index value for each of the one or more alternate PRS configurations, the one or more alternate PRS parameters, or both.

27. The method of claim 17, wherein the first request includes one or more timestamps or durations during which the network node would be expected to transmit the one or more on-demand PRS resources to the one or more target UEs.

28. The method of claim 17, wherein the first request includes one or more quality of service indications that the network node is expected to consider when determining the one or more on-demand PRS resources.

29. The method of claim 17, wherein the second request identifies the at least one of the one or more alternate PRS configurations or the at least one of the one or more alternate PRS parameters with an index value associated with the at least one of the one or more alternate PRS configurations or the at least one of the one or more alternate PRS parameters.

30. The method of claim 17, further comprising:
   receiving, from the network node, an acknowledgment indicating that the network node will transmit at least one on-demand PRS resource according to the at least one of the one or more alternate PRS configurations, the at least one of the one or more alternate PRS parameters, or both.

31. The method of claim 17, wherein:
   the network node is a base station,
   the one or more on-demand PRS resources are one or more on-demand downlink PRS resources,
   the request is a first New Radio positioning protocol type A (NRPPa) message,
   the response is a second NRPPa message, and
   the second request is a third NRPPa message.

32. The method of claim 17, wherein:
   the network node is a UE,
   the one or more on-demand PRS resources are one or more on-demand sidelink PRS resources,
   the request is a first Long-Term Evolution positioning protocol (LPP) message,
   the response is a second LPP message, and
   the second request is a third LPP message.

33. A network node, comprising:
   a memory;
   at least one transceiver; and
   at least one processor communicatively coupled to the memory and the at least one transceiver, the at least one processor configured to:
      receive, via the at least one transceiver, from a location server, a first request requesting on-demand positioning reference signal (PRS) configurations supported by the network node;
      cause the at least one transceiver to transmit a response to the location server, the response identifying one or more alternate PRS configurations, one or more alternate PRS parameters, or both defining one or more on-demand PRS resources the network node would prefer to transmit during a positioning session between the location server and one or more target UEs;
      receive, via the at least one transceiver, from the location server, a second request requesting on-demand PRS transmission, the second request identifying at least one of the one or more alternate PRS configurations, at least one of the one or more alternate PRS parameters, or both; and
      cause the at least one transceiver to transmit at least one of the one or more on-demand PRS resources according to the at least one of the one or more alternate PRS configurations, the at least one of the one or more alternate PRS parameters, or both.

34. The network node of claim 33, wherein the response further includes a priority indicator associated with each of the one or more alternate PRS configurations, the one or more alternate PRS parameters, or both.

35. The network node of claim 33, wherein the response further includes a timestamp or time duration associated with each PRS configuration or PRS parameter of the one or more alternate PRS configurations, the one or more alternate PRS parameters, or both, the timestamp or duration indicating a time period during which the PRS configuration or the PRS parameter is valid.

36. The network node of claim 33, wherein the response further includes a list of PRS scrambling identifiers that the network node can support.

37. The network node of claim 33, wherein the first request includes one or more timestamps or durations during which the network node would be expected to transmit the one or more on-demand PRS resources to the one or more target UEs.

38. The network node of claim 33, wherein the first request includes one or more quality of service indications that the network node is expected to consider when determining the one or more on-demand PRS resources.

39. The network node of claim 33, wherein the second request identifies the at least one of the one or more alternate PRS configurations or the at least one of the one or more alternate PRS parameters with an index value associated with the at least one of the one or more PRS configurations or the at least one of the one or more alternate PRS parameters.

40. A location server, comprising:
   a memory;
   at least one transceiver; and
   at least one processor communicatively coupled to the memory and the at least one transceiver, the at least one processor configured to:
      cause the at least one transceiver to transmit, to a network node, a first request requesting on-demand positioning reference signal (PRS) configurations supported by the network node;
      receive, via the at least one transceiver, a response from the network node, the response identifying one or more alternate PRS configurations, one or more alternate PRS parameters, or both defining one or more on-demand PRS resources the network node would prefer to transmit during a positioning session between the location server and one or more target UEs; and
      cause the at least one transceiver to transmit, to the network node, a second request requesting on-demand PRS transmission, the second request identifying at least one of the one or more alternate PRS configurations, at least one of the one or more alternate PRS parameters, or both.

* * * * *